United States Patent
Holenstein et al.

(10) Patent No.: US 10,216,820 B1
(45) Date of Patent: Feb. 26, 2019

(54) METHOD AND APPARATUS FOR RESOLVING CONSTRAINT VIOLATIONS IN A DATABASE REPLICATION SYSTEM

(71) Applicant: Gravic, Inc., Malvern, PA (US)

(72) Inventors: Paul J. Holenstein, Downingtown, PA (US); John R. Hoffmann, Kennett Square, PA (US); Bruce D. Holenstein, Media, PA (US); Wilbur H. Highleyman, Blairstown, NJ (US)

(73) Assignee: Gravic, Inc., Malvern, PA (US)

( * ) Notice: Subject to any disclaimer, the term of this patent is extended or adjusted under 35 U.S.C. 154(b) by 0 days.

(21) Appl. No.: 15/839,029

(22) Filed: Dec. 12, 2017

Related U.S. Application Data

(60) Provisional application No. 62/434,124, filed on Dec. 14, 2016.

(51) Int. Cl.
  *G06F 17/30* (2006.01)
  *G06F 11/20* (2006.01)
  *G06F 3/06* (2006.01)

(52) U.S. Cl.
  CPC ........ *G06F 17/30575* (2013.01); *G06F 3/065* (2013.01); *G06F 3/0605* (2013.01); *G06F 11/2023* (2013.01); *G06F 11/2097* (2013.01); *G06F 17/30227* (2013.01); *G06F 17/30368* (2013.01); *G06F 17/30371* (2013.01); *G06F 17/30377* (2013.01)

(58) Field of Classification Search
  CPC ......... G06F 17/30578; G06F 17/30575; G06F 17/30377; G06F 17/30581; G06F 17/30371; G06F 17/30368
  USPC .................................................. 707/610, 615
  See application file for complete search history.

(56) References Cited

U.S. PATENT DOCUMENTS

| | | | |
|---|---|---|---|
| 5,799,305 A * | 8/1998 | Bortvedt | G06F 9/466 |
| 6,122,630 A * | 9/2000 | Strickler | G06F 17/30575 |
| 7,949,640 B2 | 5/2011 | Holenstein et al. | |
| 8,086,661 B2 | 12/2011 | Holenstein et al. | |
| 8,903,779 B1 * | 12/2014 | Holenstein | G06F 11/1469 |
| | | | 707/685 |
| 2005/0192989 A1 * | 9/2005 | Adiba | G06F 17/30371 |
| 2006/0149799 A1 * | 7/2006 | Wong | G06F 17/30575 |
| 2006/0178918 A1 * | 8/2006 | Mikurak | G06Q 10/06 |
| | | | 705/7.25 |

* cited by examiner

*Primary Examiner* — James Trujillo
*Assistant Examiner* — Fariborz Khoshnoodi
(74) *Attorney, Agent, or Firm* — Panitch Schwarze Belisario & Nadel LLP

(57) ABSTRACT

An extractor and an applier of a database replication system are configured to perform the functions of resolving constraint violations for replicated database transactions. The extractor replicates changes made at the source database to the target database. An applier immediately applies the changes to the target database that do not cause a constraint violation. The applier also performs the remaining functions, including detecting database changes that cause constraint violations, subsequent processing of these detected database changes, and performing a commit for the database transaction when the constraint violations are resolved.

18 Claims, 11 Drawing Sheets

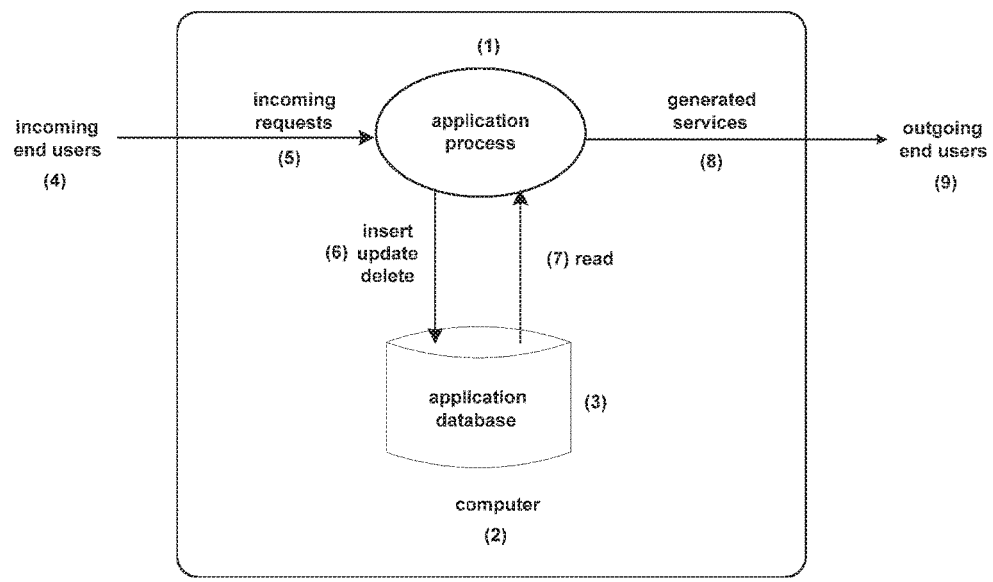
Figure 1: Prior Art - A Computer Application
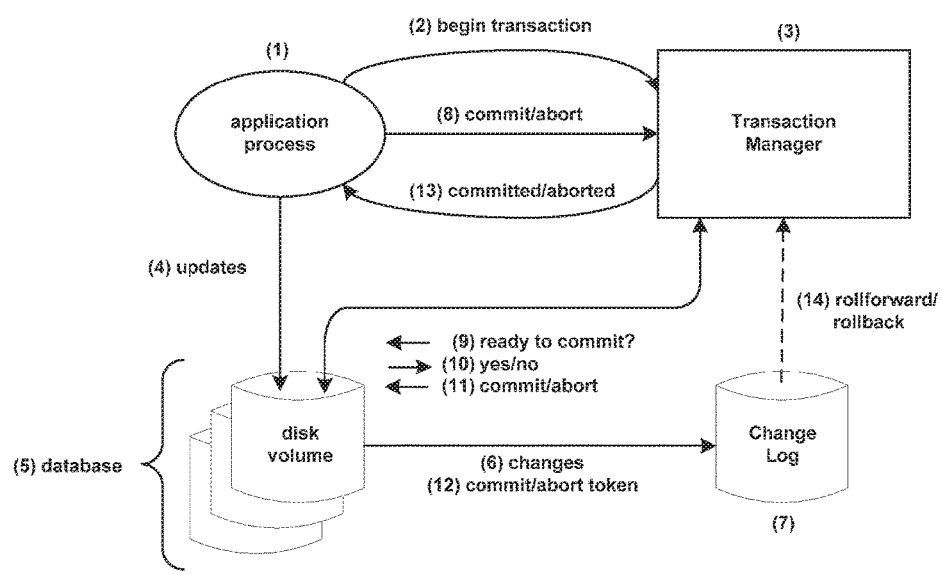
Figure 2: Prior Art - Transaction Manager

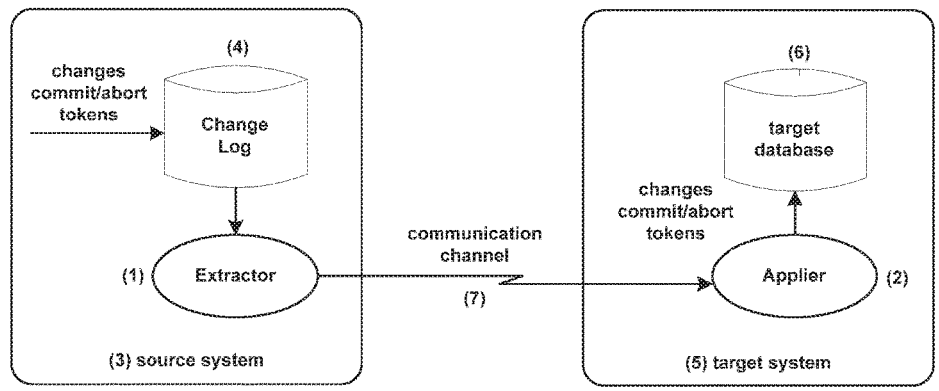
Figure 3: Prior Art - Data Replication
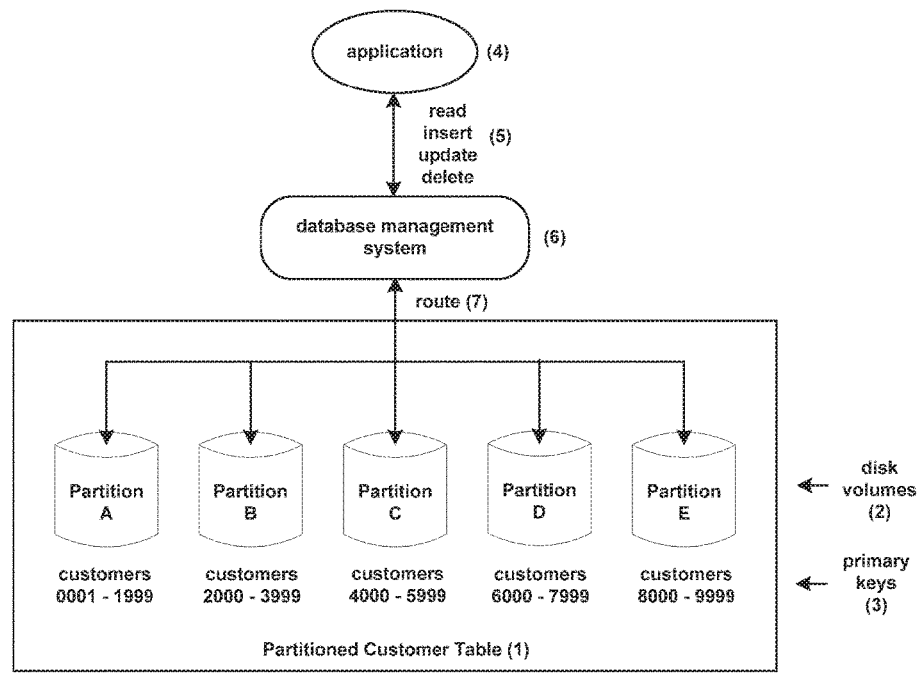
Figure 4: Prior Art - Table Partitioning

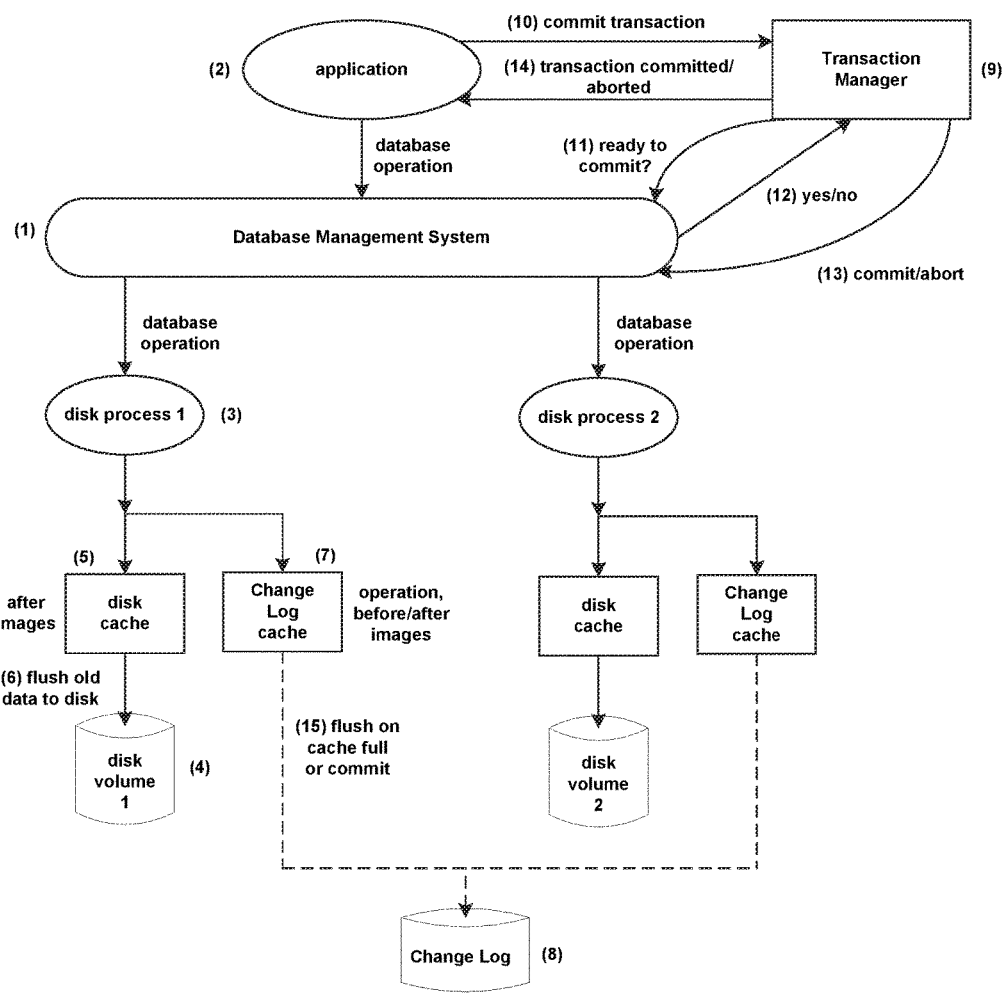
Figure 5: Prior Art - Enhancing Database Performance with Multithreaded Parallelism

| Phase | Source System | Target System |
|---|---|---|
| Initial Rows | [P1, 1, 1] | [P1, 1, 1] |
| Transaction | Tx1: D(P1, 1, 1)<br>Tx1: I(P2, 2, 1) | |
| As replayed from Change Log (changes reversed) | | Tx1: I(P2, 2, 1) ← Fails – duplicate key error on unique alternate key<br>Tx1: D(P1, 1, 1) |
| Result Rows | [P2, 2, 1] | empty |

Figure 6: Prior Art - Unique Alternate Key Relational Constraint Violation

| Phase | Source System | Target System |
|---|---|---|
| Initial Rows | [PARENT, P1, 132]<br>[CHILD, P2, 1, 132] | [PARENT, P1, 132]<br>[CHILD, P2, 1, 132] |
| Transaction | Tx1: D(CHILD, P2, 1, 132)<br>Tx1: D(PARENT, P1, 132) | |
| As replayed from Change Log (changes reversed) | | Tx1: D(PARENT, P1, 132) ← Fails – deletes parent before child<br>Tx1: D(CHILD, P2, 1, 132) |
| Result Rows | empty | [PARENT, P1, 132] |

Figure 7: Prior Art - Foreign Key Relational Constraint Violation

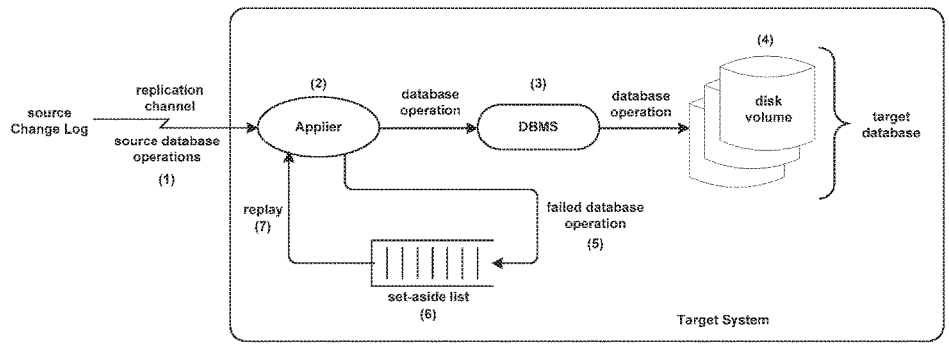

Figure 8: The Set-Aside List

| New Change for Primary Key "i" | Change on Set-Aside List for Primary Key "i" | | |
|---|---|---|---|
| | Insert | Update | Delete |
| Insert | Replace old insert with new insert.<br><br>Retry new insert. If successful, remove new insert from list. Otherwise, leave new insert on list. | Replace old update values with values from new insert.<br><br>Retry update. If not found, convert to insert and retry. If successful, remove update or insert from list. Otherwise, leave insert on list. | Try insert. If successful, remove delete from list. Otherwise, replace delete with insert on list. |
| Update | Replace old insert values with values from update.<br><br>Retry new insert. If successful, remove from list. Otherwise, leave new insert on list. | Replace old update with new update.<br><br>Retry new update. If successful, remove from list. Otherwise, leave new update on list. | Try update. If not found, convert to insert and retry. If successful, remove delete from list. Otherwise, replace delete with insert on list. |
| Delete | Remove insert from list | Remove update from list | No action (duplicate delete) |

Figure 9: Overwriting Previous Changes with Same Primary Key

| Source-Side Processing |||| 
|---|---|---|---|
| Source Table | Application Changes | Change Log Changes | |
| [P1, 1, 10]<br><br>[P2, 2, 10] | D(P1, 1, 10)<br>I(P2, 2, 10) | I(P2, 2, 10)<br>D(P1, 1, 10) | |
| Target-Side Processing ||||
| Target Table | Change Log Changes | Comments | Set-Aside List |
| [P1, 1, 10]<br><br>empty | I(P2, 2, 10)<br>D(P1, 1, 10) | ← Fails – duplicate key error. Put in set-aside list. Delete succeeds. | I(P2, 2, 10) |
| empty<br><br>[P2, 2, 10] | I(P2, 2, 10) | ← Replay Set-Aside List. Insert succeeds. | |

Figure 10: Simple Out-of-Order Example

| Source-Side Processing |||| 
|---|---|---|---|
| Source Table | Application Changes | Comments | Change Log Changes |
| [P1, 1, 1]<br>[P1, 2, 2]<br><br><br>[P1, 1, 1]<br>[P1, 2, 2] | U(P1, 1, 2) | ← Fails – duplicate unique key error.<br>Insert reversing update →<br>Into Change Log. | U(P1, 1, 2)<br><br>RU(P1, 1, 1) |
| Target-Side Processing ||||
| Target Table | Change Log Changes | Comments | Set-Aside List |
| [P1, 1, 1]<br>[P1, 2, 2] | U(P1, 1, 2) | ← Fails – duplicate unique key error. Put in set-aside list. | U(P1, 1, 2) |
| [P1, 1, 1]<br>[P1, 2, 2] | RU(P1, 1, 1) | ← Convert update in set-aside list to U(P1, 1, 1). | U(P1, 1, 1) |
| [P1, 1, 1]<br>[P1, 2, 2] | U(P1, 1, 1) | ← Replay Set-Aside List. Update succeeds. No change | |

Figure 11: Reversing Update Example

| Source-Side Processing |||||
|---|---|---|---|
| Source Table | Application Changes | Comments | Change Log Changes |
| [P2, 2, 1]<br>[P3, 3, 2]<br><br><br><br><br><br>[P1, 1, 1]<br>[P2, 2, 2] | I(P1, 1, 1)<br><br>U(P2, 2, 2)<br><br>D(P3, 3, 2)<br>U(P2, 2, 2)<br>I(P1, 1, 1) | ← Fails – unique duplicate key error<br>← Fails – unique duplicate key error<br>Delete succeeds.<br>Update succeeds.<br>Insert succeeds. | I(P1, 1, 1)<br>U(P2, 2, 2)<br>D(P3, 3, 2)<br>RD(P1, 1, 1)<br>I(P1, 1, 1)<br>RU(P2, 2, 1)<br>U(P2, 2, 2) |
| Target-Side Processing |||||
| Target Table | Change-Log Changes | Comments | Set-Aside List |
| [P2, 2, 1]<br>[P3, 3, 2]<br><br><br><br><br>[P2, 2, 1] | I(P1, 1, 1)<br><br>U(P2, 2, 2)<br><br>D(P3, 3, 2) | ← Fails – duplicate key error. Put in set-aside list.<br>← Fails – duplicate key error. Put in set-aside list.<br>Delete succeeds | I(P1, 1, 1)<br><br>U(P2, 2, 2) |
| | RD(P1, 1, 1)<br><br>I(P1, 1, 1) | ← Corresponding insert on set-aside list. Remove it.<br>← Insert fails again. Put in set-aside list. | U(P2, 2, 2)<br><br>I(P1, 1, 1) |
| <br><br><br>[P2, 2, 2] | RU(P2, 2, 1)<br><br>U(P2, 2, 2) | ← Corresponding update on set-aside list. Remove it.<br>Update succeeds. | I(P1, 1, 1) |
| <br><br>[P1, 1, 1]<br>[P2, 2, 2] | I(P1, 1, 1) | ← Replay Set-Aside List<br>Insert succeeds. | |

Figure 12: Cascading Changes Example – Replay at Commit Time

| Source-Side Processing |||| 
|---|---|---|---|
| Source Table | Application Changes | Comments | Change Log Changes |
| [P2, 2, 1]<br>[P3, 3, 2]<br><br><br><br><br><br>[P1, 1, 1]<br>[P2, 2, 2] | I(P1, 1, 1)<br><br>U(P2, 2, 2)<br><br>D(P3, 3, 2)<br>U(P2, 2, 2)<br>I(P1, 1, 1) | ← Fails – unique duplicate key error<br>← Fails – unique duplicate key error<br>Delete succeeds.<br>Update succeeds.<br>Insert succeeds. | I(P1, 1, 1)<br>U(P2, 2, 2)<br>D(P3, 3, 2)<br>RD(P1, 1, 1)<br>I(P1, 1, 1)<br>RU(P2, 2, 1)<br>U(P2, 2, 2) |
| Target-Side Processing ||||
| Target Table | Change Log Changes | Comments | Set-Aside List |
| [P2, 2, 1]<br>[P3, 3, 2]<br><br><br><br>[P2, 2, 1] | I(P1, 1, 1)<br><br>U(P2, 2, 2)<br><br>D(P3, 3, 2) | ← Fails – duplicate key error. Put in set-aside list.<br>← Fails – duplicate key error. Put in set-aside list.<br>Delete succeeds | I(P1, 1, 1)<br><br>U(P2, 2, 2) |
| [P2, 2, 1]<br><br><br><br><br><br>[P2, 2, 2] | <br><br>I(P1, 1, 1)<br><br>U(P2, 2, 2) | Successful delete. Replay set-aside list.<br>Fails – duplicate key error. Leave on set-aside list.<br>Update succeeds. Remove from set-aside list. | <br><br>I(P1, 1, 1) |
| [P2, 2, 2]<br><br>[P1, 1, 1]<br>[P2, 2, 2] | <br><br>I(P1, 1, 1) | Successful update. Replay set-aside list.<br>Insert succeeds. Remove from set-aside list. | |
| [P1, 1, 1]<br>[P2, 2, 2]<br><br><br>[P1, 1, 1]<br>[P2, 2, 2] | RD(P1, 1, 1)<br>I(P1, 1, 1)<br>RU(P2, 2, 1) | Reversing delete succeeds.<br>Insert succeeds.<br>← Fails. Duplicate key error. Put in set-aside list. | RU(P2, 2, 1) |
| [P1, 1, 1]<br>[P2, 2, 2]<br><br><br><br>[P1, 1, 1]<br>[P2, 2, 2] | U(P2, 2, 2) | Update on set-aside list. Retry with new values. Succeeds. Remove it from set-aside list. No change. | |

Figure 13: Cascading Changes Example – Replay on Successful Change

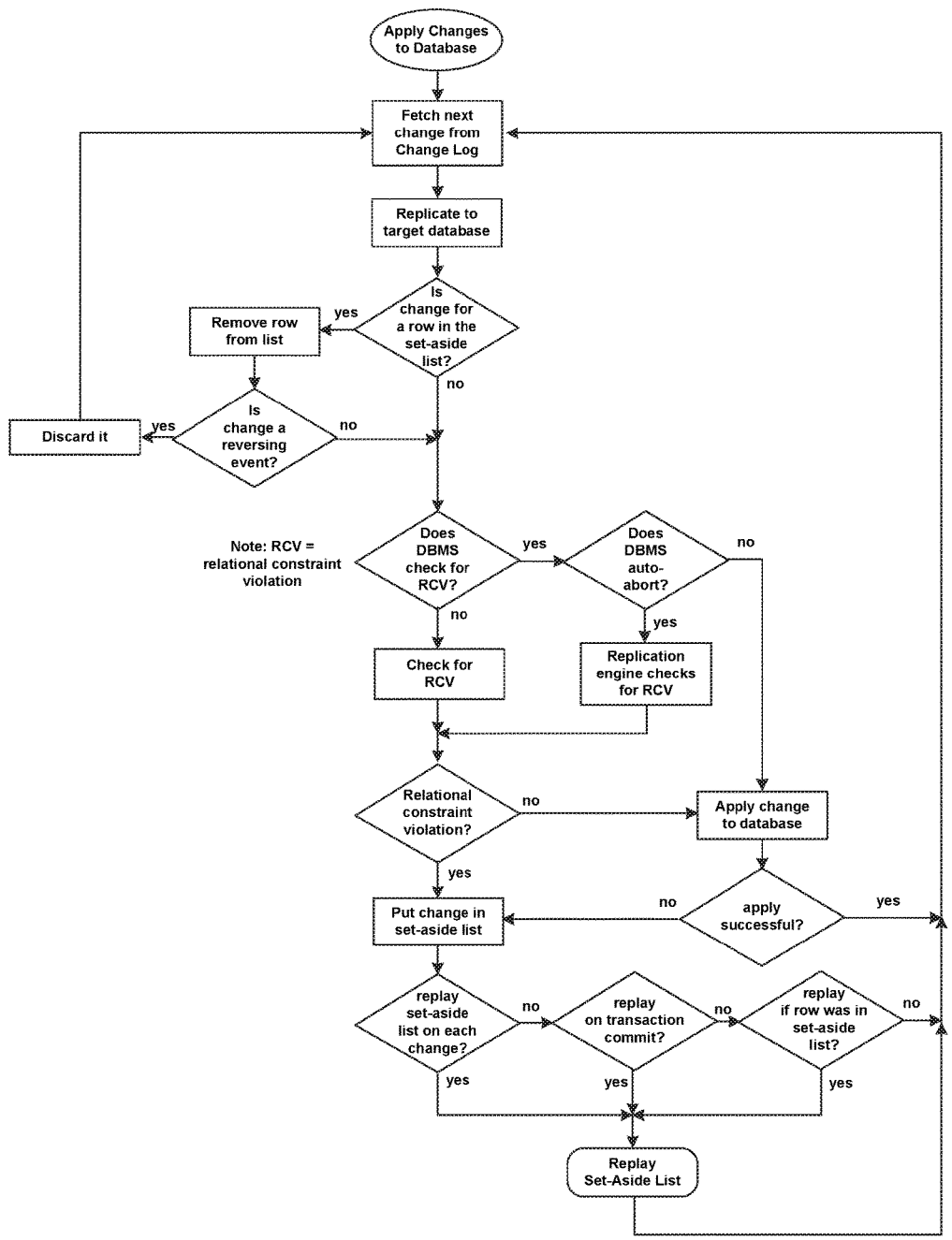
Figure 14: Flowchart for Resolving Relational Constraint Conflicts

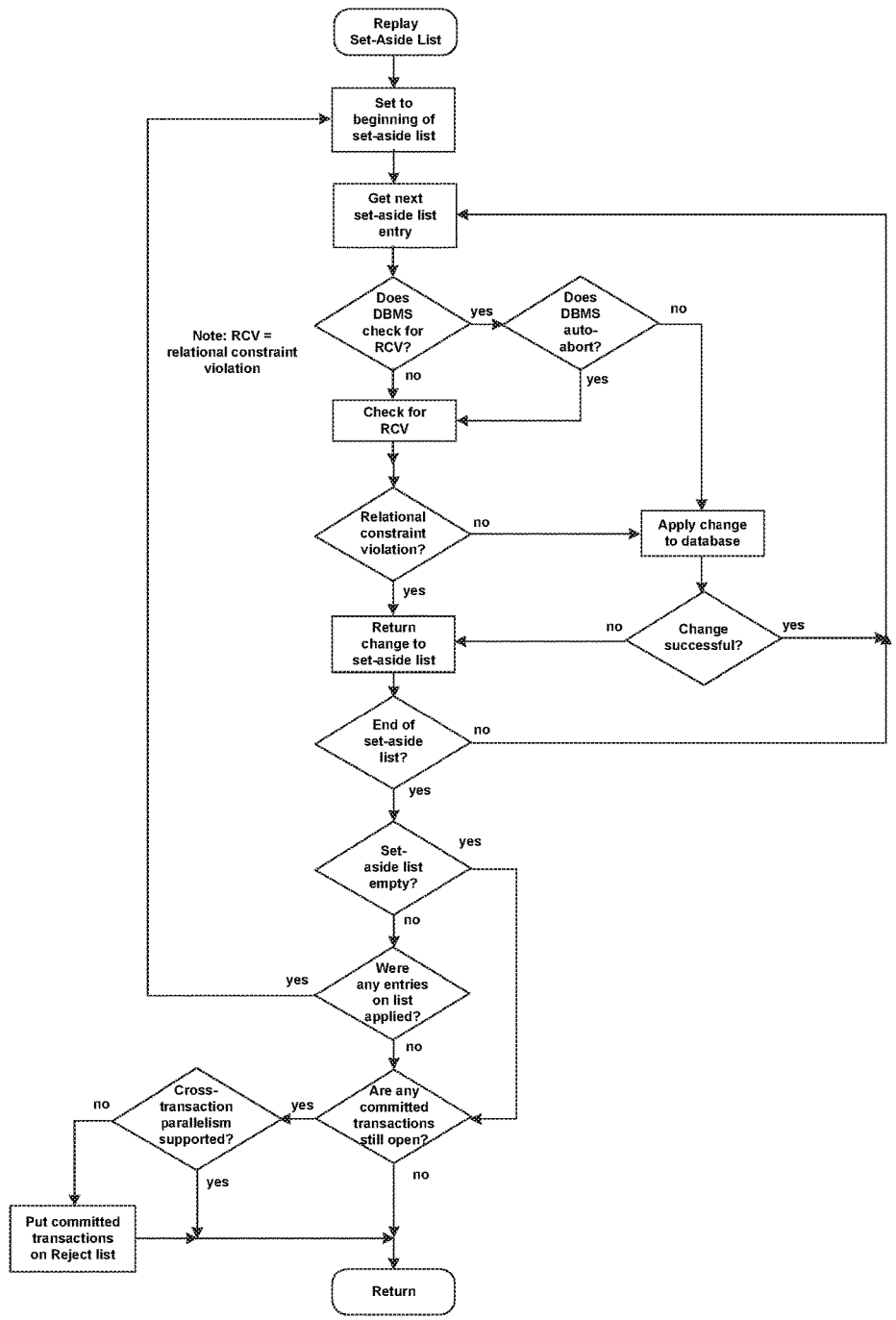
Figure 15: Flowchart for Replaying the Set-Aside List

METHOD AND APPARATUS FOR RESOLVING CONSTRAINT VIOLATIONS IN A DATABASE REPLICATION SYSTEM

CROSS-REFERENCE TO RELATED APPLICATIONS

This application claims priority to U.S. Provisional Patent Application No. 62/434,124 filed Dec. 14, 2016, which is incorporated herein by reference.

Certain terms used in the following sections are defined in Section 3, "Definitions."

BACKGROUND OF THE INVENTION

1 Background

1.1 Computer Applications

Much of our daily life is augmented by computers. The many services upon which we depend, our banking, communications, air and rail travel, online shopping, credit-card and debit-card purchases, mail and package delivery, and electric-power distribution, are all managed by computer applications.

1.1.1 Processes

In its simplest form, as shown in FIG. 1, a typical computer application is implemented as a computer program (1) running in a computer (2). A computer program is basically a set of computer-encoded instructions, often called an executable because it can be executed by a computer. A computer program running in a computer is called a process, and each process has a unique identification known to the computer. Many copies of the same computer program can be running in a computer as separately distinguishable processes.

An application typically includes multiple interacting processes.

1.1.2 Application Database

Referring to FIG. 1, in many cases an application depends upon a database (3) of information that the application maintains to record its current state. Often, the information in the database is fundamental to the operation of the application, to the decisions it makes, and to its delivery of services to end users.

The database may be stored in persistent storage such as a disk for durability, it may be stored in high-speed memory for performance, or it may use a combination of these storage techniques. The database may be resident in the same computer as the application program, it may be resident in another computer, it may be implemented as an independent system, or it may be distributed among many systems.

A database generally includes one or more files or tables, though it may be just a random collection of unorganized data. Each file or table typically represents an entity set such as "employees" or "credit cards." A file comprises records, each describing a member of an entity set, such as an employee. A table comprises rows that describe members of an entity set. A record comprises fields that describe attributes of the entity set, such as salary. A row comprises columns that describe attributes of the entity set. In this specification, "files" are equivalent to "tables;" "records" are equivalent to "rows;" and "fields" are equivalent to "columns."

1.1.3 Request Processing

With further reference to FIG. 1, incoming end users (4) generate requests (5) to be processed by the computer application. End users may be people, other computer applications, other computer systems, or electronic devices such as electric power meters. In this specification, the term "end user" means any entity that can influence an application and/or can use the services that the application provides.

As part of the processing of a request, the application may make certain modifications to its database (6). It can insert rows, update rows, and delete rows. The application can read the contents of rows in its database (7). It may read certain information from its database to make decisions. Based on the request it received from an incoming end user and the data in its database, the application will deliver certain services (8) to its outgoing end users (9).

1.2 Transactions

In many applications, changes to the database, i.e., inserts, updates, deletes, or changes to the database structure, are organized as transactions. A transaction is a delimited set of changes that either must all be made to a database or sent to an application, or else none are. For instance, a transaction in a banking application may transfer funds from one account to another. The transaction applies a debit to one account (a reduction in its value) and an equal credit to another account (an increase in its value). Either both of these updates must occur or neither must occur in order to keep the customer's accounts balanced.

1.2.1 The ACID Properties of Transactions

Transactions typically exhibit ACID properties—Atomicity, Consistency, Isolation, and Durability:

Atomicity means that either all changes contained within the transaction are executed against the database or that none are.

Consistency means that at any time, the view of the database represents an accurate view of the application data.

Isolation means that a transaction is unaffected by other transactions that are executing simultaneously.

Durability means that the resulting modification to the database by a transaction will survive any subsequent system failures.

In some implementations, the ACID properties may be relaxed. For instance, the attributes of consistency and isolation may be traded for performance. Eventual consistency may be used in which the database will achieve consistency after a period of time.

The changes comprising a transaction are delimited by a pair of directives. The beginning of a transaction is identified by a Begin Transaction directive (in some systems, the Begin Transaction directive is implied by the first operation of a new transaction). The conclusion of a transaction is either a Commit Transaction directive or an Abort Transaction directive. A Commit Transaction directive causes all of the changes within the transaction to be applied to the database and to be durable. An Abort Transaction directive causes the changes within the transaction to be discarded. Though the terms Begin Transaction, Commit Transaction, and Abort Transaction are used in this specification, they are often known by different terms in different systems. However, the actions they denote are substantially the same in all systems.

A typical transaction appears as follows:
Begin Transaction
Insert Row A
Read Row B
Update Row B
Delete Row C
Commit Transaction

1.2.2 Transaction Manager

A transaction may span and modify several resources. The most common resource is a disk volume, though there may be other resources such as a synchronous replication engine. A database may be spread across several disk volumes, each a separate resource. Before a transaction can be committed, all resources must agree that they have received all of their changes and that they have safe-stored them or applied them to their portions of the database. If all resources can commit their changes, the transaction is committed; and the changes are made to the resources. If any resource cannot commit its changes, the transaction is aborted; and no changes are made to the database. This ensures the attribute of atomicity—either all changes within the bounds of the transaction are applied to the database, or none are.

Coordinating the commit of a transaction is the job of the Transaction Manager, as shown in FIG. 2. When an application (1) wishes to begin a transaction, it makes a request (2) to the Transaction Manager (3). The application then applies the changes (4) bounded by the transaction to its application database (5). As each change is made, its before and/or after images are written (6) to a Change Log (7).

When the application has completed the database changes for the transaction, it sends a commit request (8) to the Transaction Manager. The Transaction Manager next asks each resource involved in the transaction (typically, the disk volumes that had been involved in the transaction) if it is ready to commit (9). If all resources respond positively (10), the Transaction Manager instructs them to commit the transaction (11). It will write a commit token to the Change Log (12) and will inform the application that the transaction has been committed (13).

If any resource responds that it cannot make the changes to its database (10), the Transaction Manager informs all databases and resources to abort the transaction (11). No changes will be made to the databases, and all locks will be released. An abort token typically is written to the Change Log (12), and the application is informed that its transaction has been aborted (13). The application can also request that the Transaction Manager abort the transaction (8) rather than ask the Transaction Manager to commit the transaction.

The Transaction Manager typically uses the Change Log (7) to correct corruption to the database. It uses the before images stored with each change to roll back data objects to their original values if they have been erroneously changed. It uses the after images in the Change Log to roll forward data objects whose changes have become lost due to a system malfunction (14).

1.3 Data Replication

Many applications share data between two or more systems or environments that may be on the same or different systems. Data sharing can be accomplished using data replication. A data replication engine accesses data changes generated by a source system or environment and transfers the changes to a target system or environment. The target system or environment applies the changes to the target database to keep the source database and the target database synchronized.

In some data replication environments, the target database has a different structure from the source database. In such a heterogeneous replication environment, the target database may have different relational constraints. In the preferred embodiment of the invention, the replication engine will make appropriate adjustments to the stream of database changes to ensure that the replication constraints at the target database are satisfied.

1.3.1 The Replication Engine

Database changes are typically made available to the replication engine via the Change Log described in Section 1.2.2, "Transaction Manager." The Change Log contains all of the database changes and the commit/abort tokens made by the various source applications. The replication engine follows the changes recorded in the Change Log and replicates them to the target system.

As illustrated in FIG. 3, the replication engine comprises an Extractor (1) and an Applier (2). The Extractor is typically collocated on the source system (3) with the Change Log (4). The Applier is typically resident on the target system (5) with the target database (6).

It is the job of the Extractor to follow the Change Log and to read the changes as they are entered into the change queue. The Extractor sends each change (or blocks of changes to improve communication-line utilization) over a communication channel (7) to the Applier, which applies the changes to the target database.

For increased performance, the various components of the replication engine can be multithreaded. There may by multiple Extractors, multiple communication channels, and multiple Appliers all sharing the replication load.

In many applications, replication is performed on transactions. Although individual changes are sent from the source system to the target system, the target system may hold them until it receives a transaction-completion directive from the source system. If this directive is a commit transaction, the target system will process the changes. If the directive is an abort transaction, the target system will reject the changes.

There are two types of data replication—asynchronous replication and synchronous replication.

1.3.2 Asynchronous Replication

When asynchronous replication is used, the target system initiates a transaction that is independent from that on the source system. When the source system requests that its Transaction Manager start a transaction, the Transaction Manager may insert a begin-transaction token into the Change Log. When the target system reads the begin-transaction token, it initiates an independent transaction via a target-side Transaction Manager. Alternatively, there may be no begin-transaction token; and the initiation of a new transaction is implied by the first transaction operation received by the target system.

As database changes are received by the target system, they are applied to the target database under their respective target-side transactions. Alternatively, the target system may safe-store the changes to durable storage without applying them to the database with the intent of holding them for eventual replay and an eventual commit operation.

When the source system commits or aborts a transaction, the source Transaction Manager will write a commit token or an abort token to the Change Log. This token will propagate to the target system via the replication engine and will cause the target-side Transaction Manager to commit or abort the target-side transaction.

With asynchronous replication, the transfer of data from the source system to the target system is undertaken independently of the source-system processing. The source system is not aware that data replication is taking place, as data to be replicated is read from the Change Log after the source system has recorded it. There is a delay from when data or tokens are entered into the Change Log at the source system and when they are applied to the target database. This delay is known as replication latency. Should the source system, the replication network, or the replication engine fail, any changes in the replication pipeline represented by the replication latency will be lost.

1.3.3 Synchronous Replication

With synchronous replication, the transaction typically is not committed on the source system unless the source system is assured that the transaction can be or is also committed on the target system. Therefore, the source and target databases will always be synchronized even in the event of a replication failure. A transaction is either committed on both the source and target systems, or it is committed on neither.

One embodiment of a synchronous replication engine (the so-called Coordinated Commit method) uses asynchronous replication to transfer data changes from the source system to the target system. Via this method, however, the replication engine requests the source-side Transaction Manager to allow it to join the transaction as a voting resource.

When all changes for the transaction have been made to the source and target databases via the asynchronous replication channel, the Transaction Manager asks all resources if they are prepared to commit the transaction. Since the replication engine is a voting participant in the process, it can vote to commit or abort the transaction. If the target system has been successful at safe-storing or applying all of the transaction's changes, the replication engine will vote to commit the transaction. If all other resources vote to commit, the source-side Transaction Manager will commit the transaction on the source system. The replication engine will then commit the transaction on the target system. If any resource, including the replication engine, votes to abort the transaction, the Transaction Manager will abort the transaction on the source system and the replication engine will abort the transaction on the target system.

With synchronous replication, no data is lost if the replication channel fails. Either the transaction is committed on both systems, or it is committed on neither. However, the source system must wait for the target system to receive all of the transaction changes over the replication channel and to vote before the source system can commit the transaction. This is a delay that may lengthen the source application's response time for the source transaction. The delay is known as application latency.

1.4 Relational Constraints

Many databases are managed by a Database Management System (DBMS). The databases may be comprised of files, of tables, or of both. Often, the databases are relational databases. Relational databases are organized by keys (also called indices). A DBMS can be asked to insert, update, delete, or retrieve selective data from the database according to a key specification (such as a SQL SELECT). Examples of DBMSs that manage relational tables include MySQL, Oracle, and Hewlett Packard Enterprise® (HPE) NonStop® SQL. SQL is the standard language supported by these DBMSs. Examples of DBMSs that manage file systems include IBM's VSAM and HPE NonStop Enscribe. There is no standardized language for file-oriented DBMSs.

Each row in a table is identified by a unique primary key. The row can be accessed directly by specifying the value of its primary key. An example of a primary key is an employee ID. If an employee ID is specified to the DBMS, it will return the row for that employee.

In addition, each row or record may by indexed by one or more alternate keys. An alternate key can be used to access multiple records with the same alternate key. An example of an alternate key is a zip code. If a zip code is specified to the DBMS, it will return all rows that carry that zip code.

To maintain the integrity of the database, the DBMS will often enforce certain constraints on the contents of rows and their keys as rows are inserted, updated, or deleted. These constraints are known as relational constraints. If a change to the database violates a relational constraint, the change will be rejected as an error.

Note that many types of data conflict can occur that would otherwise prevent the change data from being successfully replayed at the target environment. These conflicts will be processed using the same approach as defined for the relation constraint situation.

Certain relational constraints that are pertinent to this invention are described below.

1.4.1 Primary Keys

A primary key must be unique within a table since it identifies a particular row in a table. If an attempt is made to insert a row with a primary key that is already in use, the insert will be rejected by the DBMS as an error. Likewise, if an attempt is made to modify a row in order to change its primary key, but the new primary key already exists, the change will be rejected.

1.4.2 Unique Alternate Keys

Alternate keys are typically not unique. It is the purpose of an alternate key to specify a range of rows with an identical attribute, such as zip code.

However, in some cases, it is desirable to use unique alternate keys. In these cases, only one row in the entire table can have a specific value for the alternate key. In this regard, the unique alternate key is much like a primary key. Either the primary key can be used to locate the row, or the unique alternate key can be used. An example of a unique alternate key would be a social security number in an employee row that carries the employee's ID as the row's primary key.

As with primary keys, if an attempt is made to insert a row with a unique alternate key that is already in use, the insert will be rejected by the DBMS as an error. Likewise, if an attempt is made to modify a unique alternate key in a row in order to change it, but the new alternate key already exists, the change will be rejected.

1.4.3 Foreign Keys

A key that exists in one row yet points to another row is called a foreign key. The row to which the foreign key points is often in another table. The foreign key field often contains the primary key or an alternate key (which is often unique) of the row to which the foreign key is pointing. The row containing the foreign key is known as the child row. The row to which the foreign key is pointing is known as the parent row.

An example of the use of foreign keys is invoices. There may be an Invoice Header Table, in which each row contains an invoice number (the primary key), a customer identification number, and a date for an invoice. An invoice row is a parent row. Line items for the invoice are contained in another table, the Line-Item Table. Each line-item row (a child row) contains a foreign key that contains an invoice number. The invoice number links the child line item to the primary key of its parent. Each line-item row also includes a line-item number. The concatenation of the invoice number and the line-item number columns in a line-item row is the primary key for the Line-Item Table.

A relational constraint will often dictate that a child row cannot exist without a parent row. Thus, an attempt to insert a child row if there is not a corresponding parent row will be rejected. Likewise, if an attempt is made to delete a parent row while it still has child rows pointing to it, the delete will be rejected.

This constraint is called referential integrity.

1.4.4 Derived Value Constraint

Often, for performance or other reasons, a row will contain a column that is derived from the contents of other rows. An example is a purchase-order header that has a "sum" column that contains the sum of the individual line items. This is a violation of the database normalization rule (i.e., no data is represented twice in the database) but is used to improve performance. In this example, one read will get the total of the purchase order rather than having to read and sum all of the line-item rows.

1.4.5 Other Forms of Constraints

Other forms of database constraints often exist. For instance, a constraint may be defined to validate the requirement that a salary field is always a positive number or that at least one line item be a child row to an invoice header row (that is, every invoice must contain at least one line item). If one of these constraints is violated, the change or the transaction is rejected.

1.5 Relational Constraint Conflicts

The Change Log contains all of the changes made to a database by various applications. This record of changes can be used by a data replication engine to apply the changes to a target database. The Change Log can also be used by a Transaction Manager to roll forward or roll back a corrupted database, as described in Section 1.2.2, "Transaction Manager." If the changes in the Change Log are recorded in the exact order in which they were made to the database, a straightforward reading of the changes in the Change Log will suffice to meet these uses.

1.5.1 Misordering of Changes in the Change Log

However, if the change order is changed arbitrarily in the Change Log, or if the target database has a different structure than the source database and has different relational constraints, relational constraint conflicts can occur. For instance, if a sequence of changes includes the delete of a row followed by the insertion of another row with the same primary key, replaying these two changes in order will succeed. However, if the changes are reversed somehow in the Change Log, the insertion change (which will be executed first) will fail because of a duplicate primary key error. The delete change will succeed, with the result being that the record with that primary key will disappear from the target and data corruption will occur.

Some DBMSs in use today do not guarantee the correct order in the Change Log. They are typically database managers that provide a high degree of parallel processing to enhance performance. Each of the processing threads writes independently to the Change Log, and related changes in different threads can be written out of order. For instance, changes made to different partitions of the same table may be written to the Change Log by different processing threads in a different order than the original database operations originally occurred in.

It is a purpose of the preferred embodiment of this invention to reorder such changes so that they can be applied to the target database without referential constraint violations.

1.5.2 Data Collisions in Active/Active Systems

Another source of relational constraint conflicts are data collisions that can occur in active/active systems. An active/active system is one in which two or more nodes are simultaneously processing transactions for the same application. Each node has a copy of the application database, and the database copies are kept synchronized via bidirectional replication. Whenever a change is made to one database, that change is immediately replicated to the other databases.

However, there is a brief delay (typically in the order of subseconds to seconds) from the time that the change is made at one node to the time that it appears at the other nodes. This delay in known as replication latency. A data collision occurs if applications on two different nodes make a change to their copy of the same data object at approximately the same time—within the replication latency interval. Each change will be replicated to the other system where it will overwrite the change originally made at that system. Now both databases are different and both are wrong.

Data collisions can lead to referential constraint violations when the changes are replicated. Consider the case in which the synchronized databases contain a parent row with no children. System A deletes the parent row. At the same time, System B adds a child to the parent row. System A will replicate the parent row delete to System B, which will reject it as a relational constraint violation because its parent row has a child. Likewise, System B will replicate the addition of a child record to System A, which will reject it as a violation since there is no parent for the child record.

Similarly, if both systems added a row with the same primary key to the database at the same time, the replicated changes would be rejected at the target systems as a relational constraint violation because of duplicate keys.

Referential constraint violations caused by data collisions are typically not recoverable, unless they are modified in some way. The transactions involved are typically set aside in a reject list for further subsequent review.

1.6 Database Management System (DBMS)

A Database Management System (DBMS) is a suite of computer software that provides the interface between applications and the database or databases that the application is using. The services that a DBMS provides, among others, include:

Defining the structure of the database and subsequently modifying it via DDL (data definition language) commands. The structure includes the tables in the database, the columns that make up each table, and the definition of primary keys, alternate keys (including unique attributes), and foreign keys.

Retrieving data from the database.

Changing the contents of the database via insert, update, and delete commands issued to the DBMS by applications via DML (data manipulation language) commands.

Ensuring that relational constraints are followed and rejecting any change that violates a relational constraint.

Recording all changes to the database in the Change Log.

1.6.1 Relational Constraint Checking

Different DBMS's take different approaches to relational constraint checking. Some do no relational constraint checking at all. Others check relational constraints only at commit time and abort the transaction if it has violated a relational constraint. Still others check relational constraints on each database change and either return an I/O error indicating the I/O failed, or immediately abort the transaction if a relational constraint is detected.

For those DBMSs that do relational constraint checking on each database change and auto-abort on a violation, the replication engine must check that each change does not violate a relational constraint before passing it to the DBMS. If it does violate a relational constraint (that will cause an auto-abort), it must be set aside for later processing as described later in this specification.

1.6.2 Partitioning

In many large applications, the size of a table may exceed the size of a disk volume in the computer's disk farm. In this case, the table is partitioned across several disk volumes or even systems. The table is broken into sections, or partitions, typically organized by ranges of its primary key. Each partition is assigned to a different disk volume.

FIG. 4 shows a large Customer Table (1) partitioned across five disk volumes (2). The table is partitioned according to customer identification number, which is the primary key in the table (3). Customers 0001 to 1999 are assigned to Partition A, customers 2000 to 3999 are assigned to Partition B, and so on. Each partition is stored on its own disk volume.

When the application (4) makes a database request (5) for an operation on the Customer Table, the request is handled by the system's Database Manager (6). The Database Manager is aware of the partitioning and routes the database request to the appropriate disk volume for execution (7).

1.6.3 Database Parallelism

The capacity of large applications with significant database activity can be markedly improved by performing multiple operations in parallel. Rather than making one database change at a time, the DBMS is capable of performing multiple operations simultaneously. Since any one particular database disk typically can undertake only one operation at a time, database parallelism requires operations to be performed simultaneously over multiple disks.

Examples of highly parallel DBMSs are the HPE NonStop SQL database manager and the HPE NonStop Enscribe database manager. The following explanation of database parallelism is based in part on these DBMSs. Though there are other implementations of highly parallel DBMSs, many exhibit the same properties that are the subject of this invention. Such an example is Oracle RAC (Real Application Clusters) that allows several computing systems to simultaneously access a common database.

1.6.3.1 Parallel Database Access Paths

FIG. 5 illustrates a parallelized DBMS. It has available to it a number of disk volumes, each controlled by its own disk process. The DBMS is aware of the structure of the database and knows on which volumes the tables or their partitions are located. Though FIG. 5 shows only two volumes, large systems may have hundreds of disk volumes, each managed by its own disk process.

When the DBMS (1) receives a database operation request from an application (2) (such as a read, insert, update, or delete operation), it determines which disk process (3) is managing the disk volume (4) upon which the operation is to be executed. It passes that request to the corresponding disk process. Consequently, the DBMS can have multiple database operations executing simultaneously, one or more for each disk volume. Even more so, the DBMS can have multiple database operations executing simultaneously over multiple threads or processing paths.

1.6.3.2 Disk Cache

For performance purposes, the disk process often operates on database rows that are cached in high-speed memory. Each disk volume has its own disk cache (5). The disk cache holds the latest rows that have been accessed. If the operation is a read, the disk process looks to see if the row to be read is resident in disk cache and, if so, returns the row to the application. If the row is not in the disk cache, the disk process will read it from disk, will store it in the disk cache, and will return the row to the application.

If the operation is an insert, the new row is inserted into the disk cache. If it is an update, the disk process checks to see if the row is in cache. It so, it updates the cache-resident copy. If not, it reads the row from disk into cache and then updates the cached copy. If the operation is a delete, the disk process marks that row as deleted in cache or physically removes it from cache. Depending upon the size of the disk cache and the distribution of data in the database, having access to data in high-speed memory rather than having to access it from the relatively slow disks greatly speeds the database operations.

If a row must be entered into cache, but the cache is full, most DBMSs use a Least-Recently-Used (LRU) algorithm to write rows or blocks of rows to disk. The disk process will determine which rows in the cache are the oldest (that is, they have not been accessed for the longest period of time) and will write them to disk (6), thus freeing cache space for new rows.

1.6.3.3 The Change Log

Referring to FIG. 5, the DBMS maintains a log of all changes made to the database (the Change Log). Again, each disk process typically has a Change Log cache (7); although in some implementations, a combined cache is used. Whenever a row is modified, the disk process will store the operation performed on the row and the before and/or after images of the changed row in the Change Log cache. The before image of an insert is null; its after image is the inserted row. The before image of an update is the original row to be updated; its after image is the new row. The before image of a delete is the row that is to be deleted; its after image is null. Should the Change Log cache become full, or should some other DBMS event occur such as a transaction commit operation or the expiration of a timeout, the Change Log cache will be flushed to the Change Log disk (8).

1.6.3.4 Committing a Transaction

In addition, the DBMS is aware of transactions. It knows which changes belong to which transactions and whether those changes were successful. When the application requests the Transaction Manager (9) to commit a transaction (10), the Transaction Manager will ask the DBMS if it is ready to commit the transaction (11). The DBMS knows which disk volumes were party to the transaction (these are the transaction's resources described earlier in Section 1.2.2, "Transaction Manager").

The DBMS will query each disk volume that was involved in or was a resource to the transaction to determine if it was successful at executing all of the transaction's operations directed to it. If all changes were successfully applied, the DBMS will respond positively (12) to the Transaction Manager. If all other resources (if any) also respond positively, the Transaction Manager will inform the DBMS to commit the transaction (13). The Transaction Manager will then inform the application that the transaction was committed (14).

When told to commit the transaction, the DBMS will flush to the Change Log the Change Log caches of all disk volumes involved in the transaction. It will also write a commit token for the transaction into the Change Log.

If any resource votes "no," the Transaction Manager will tell the DBMS to abort the transaction. The DBMS will flush all involved Change Log caches to the Change Log and will write an abort token into the Change Log.

Flushing all changes to the Change Log at commit/abort time ensures that the transaction can be recovered if there is a system failure. The Change Log flush operation typically implements the durability attribute of transactions (see Section 1.2.1, "The ACID Properties of Transactions").

The distribution of transaction changes among multiple disk volumes or more specifically multiple Change Log caches creates a problem for a data replication engine at the target system. The flushing of the Change Log caches to the Change Log may not necessarily store the changes in the Change Log in the same order as they were applied. This may pose challenges for data replication at the target system, as described later.

1.6.4 Cross-Transaction Parallelism

Another source of challenges for data replication is cross-transaction parallelism. Two independent transactions may be simultaneously executing. As long as they are not changing a common row or rows, they may proceed independently of each other. However, one transaction may make a change which will result in a relational constraint violation for the other transaction if the transactions are executed out of order.

For instance, one transaction may delete a row with a unique alternate key value of "1" and the other transaction may subsequently insert a row with a unique alternate key value of "1." If the changes made by the two independent transactions are reversed in the Change Log, the insert will fail; but the delete will succeed. The result is that there will be no row with a unique alternate key value of "1."

1.6.5 Heterogeneous Data Replication

In some data replication environments, the target database has a different structure from the source database. Or, even if the database structure remains the same, the target database may have different relational constraints. In the preferred embodiment, the replication engine will make appropriate adjustments to the stream of database changes to ensure that the replicated data is formatted properly and that the replication constraints at the target database are satisfied.

1.7 Relational Constraint Violations Caused by Database Parallelism

When there are parallel threads or processing paths in a database manager, as described above, there is often no control over the order in which database changes for different threads appear in the Change Log. This has four important consequences:

1. All of the database changes for a particular thread (such as a disk volume) will usually appear in the Change Log in the proper order since this is how they were stored in the Change Log cache for that thread.
2. For a particular thread, all of the database changes that are included in a transaction will appear before the end of the transaction (commit/abort token) for that transaction.
3. The order of database changes of different threads may bear no time or order relationship in the Change Log. The database changes of one thread may appear in any order with respect to the database changes of another thread. If an application issues a database change for one thread followed by a database change for another thread, these two changes may be reversed in time order or in physical order in the Change Log.
4. Even though changes within a thread are stored in order in the Change Log, they may not be delivered in order to the target database. This can occur if multiple communication channels are used or if a multithreaded data replication engine is used. If the changes for a single DBMS thread are sent over different channels to the target system, their order may be changed.

Database parallelism is a particular problem for a target database to which data is being replicated. Changes that must be executed in the proper order to satisfy relational constraints may be stored and replayed in a different order if the table is partitioned across different disk volumes, if the tables involved in the relational constraint span volumes, or if multiple replication threads are used to send the data from the source system to the target system.

Consequently, some changes may be rejected at the target system due to relational constraint violations.

1.7.1 Nomenclature

To illustrate some of the issues that can occur due to improper change ordering in the Change Log, the following nomenclature will be used for brevity.

1.7.1.1 Existing Rows

An existing row is represented by the following syntax:
[{file}, partition, key, constraint, . . . ]
where
{file} is an optional file or table name that indicates the file or table if there is more than one.
partition is the partition number (P1, P2, . . . ).
key is the primary key value.
constraint is one or more constraints on the row (such as a unique alternate index or a foreign key).

1.7.1.2 Database Operations

A database operation is represented by the following syntax:
[Tx #: type ({file}, partition, key, constraint, . . . )]
where
Tx # is the transaction number in the format Txn.
type is the type of operation.
{file} is an optional file or table name that indicates the file or table if there is more than one.
partition is the partition number (P1, P2, . . . ).
key is the primary key value.
constraint is one or more constraints on the row (such as a unique alternate index or a foreign key).
Examples of Type include:
I—insert
U—update
D—delete
C—commit
A—abort
RI—reverse insert
RU—reverse update
RD—reverse delete The reverse operations undo certain source database changes that failed because of relational constraint violations. These failed database changes may or may not cause automatic transaction aborts depending upon the implementation of the DBMS. In the preferred embodiment, if a DBMS checks relational constraints and aborts transactions that create a relational constraint violation, the replication engine should check for relational constraint violations directly before sending a violating change to the DBMS. Such changes that will cause a relational constraint violation must be set aside by the replication engine for later processing as described later in this specification.

As an example of this syntax, the following operation uses two tables, PARENT and CHILD. One and only one entry in the PARENT table has a primary key of 10. The parent has two children in the CHILD table with primary keys 1 and 2. The transaction deletes the parent row following the delete of all of its children.

Initial Configuration
[PARENT, P1, 10] The parent row is in partition P1 of the PARENT table with a primary key of 10.
[CHILD, P1, 1, 10] The child row is in partition P1 of the CHILD table with a primary key of 1 and points to the parent's primary key of 10.
[CHILD, P2, 2, 10] The child row is in partition P2 of the CHILD table with a primary key of 2 and points to the parent's primary key of 10.

Transaction
Tx1: D(CHILD, P1, 1, 10)
Tx1: D(CHILD, P2, 2, 10)
Tx1: D(PARENT, P1, 10)
Final Configuration
The parent row in the PARENT table and the two child rows in the CHILD table have been removed.

The transaction succeeds because it has deleted all child rows before it deletes the parent row. It has satisfied the foreign key constraint.

1.7.2 Change Log Database Change Reordering

As discussed earlier in Section 1.7, "Relational Constraint Violations Caused by Database Parallelism," in one implementation all changes for a single partition will be properly ordered in the Change Log. However, the order of changes across partitions (if they are on different disk volumes) is indeterminate and often cannot be reordered due to insufficient information contained in the individual Change Log entries.

Consider the following transaction that inserts four rows into a table, two rows in Partition 1 and two rows in Partition 2:
Tx1: I(P1, 01)
Tx1: I(P2, 10)
Tx1: I(P1, 02)
Tx1: I(P2, 11)

The following sequences might be read from the Change Log:
Tx1: I(P1, 01) The correct transaction sequence
Tx1: I(P2, 10)
Tx1: I(P1, 02)
Tx1: I(P2, 11)
Tx1: I(P1, 01) P1 before P2
Tx1: I(P1, 02)
Tx1: I(P2, 10)
Tx1: I(P2, 11)
Tx1: I(P2, 10) P2 before P1
Tx1: I(P2, 11)
Tx1: I(P1, 01)
Tx1: I(P1, 02)
Tx1: I(P1, 01) Intermixed
Tx1: I(P2, 10)
Tx1: I(P2, 11)
Tx1: I(P1, 02)
Tx1: I(P2, 10) Intermixed
Tx1: I(P1, 01)
Tx1: I(P2, 11)
Tx1: I(P1, 02)

There are other sequences as well. In all sequences, the inserts for P1 are in order; and the inserts for P2 are in order. The following sequence will not typically occur because the order of P2's inserts is reversed:
Tx1: I(P1, 01)
Tx1: I(P1, 02)
Tx1: I(P2, 11)
Tx1: I(P2, 10)

However, if the P2 inserts are out of order, the present invention will resolve most cases of that issue, as discussed in Section 4.5, "Change Reordering Within a Thread."

1.7.3 Relational Constraint Violations Caused by Change Log Reordering

If entries in the Change Log are improperly reordered, a variety of relational constraint violations may occur.

1.7.3.1 Unique Primary Key Constraint

By definition, all primary key values in a table must be unique. However, this constraint does not present a reordering relational constraint problem. Even if a row is deleted and then reinserted with the same primary key, both changes are on the same partition. Therefore, the replication engine will always read the changes from the Change Log and will deliver them to the target system in the correct order. It is not possible to execute the insert before the delete, which would cause a duplicate primary key error.

Even if such a situation should occur, the present invention may resolve this issue. See Section 4.5, "Change Reordering Within a Thread."

However, there is another case in which a misordering of changes can cause a problem with respect to primary keys. Consider a row (P1, 1) in partition 1 with a primary key value of 1. This row is deleted [D(P1, 1)] and reinserted in partition 3 with a primary key value of 100 [I(P3, 100)]. If these two operations flush to the Change Log out of order, an attempt will be made to add a copy of an existing row into another partition. This can lead to a relational constraint violation (such as a duplicate unique alternate key) and an operation failure.

1.7.3.2 Unique Alternate Key Error

Now consider the case of a unique alternate key. Consider a row in Partition 1 with a unique alternate key of value 1. It is desired to change the primary key value for the row, which is currently 1, to a value of 2 that would put the row in Partition 2. This can be accomplished by deleting the row from Partition 1 and writing it with its new primary key value into Partition 2.

FIG. 6 shows the sequence to perform this move at the source system. However, because the changes are on different partitions, they may be stored and then read out of order from the Change Log by the replication engine and delivered out of order to the target system. FIG. 6 illustrates the consequence of this. The insert operation into Partition 2 will be executed first and will be rejected because it contains a duplicate alternate key. The delete operation will then be executed against the row in Partition 1. The result is that the row disappears on the target system.

1.7.3.3 Foreign Key Error

One example of a foreign key relational constraint requires a child row to always have a parent row. No child row can be inserted if the parent row does not exist, and no parent row can be deleted if it has a child row. FIG. 7 shows a case in which this relational constraint can be violated during replication.

In FIG. 7, the database contains a parent row in Partition P1 with a primary key of 132. The parent row has a child row in Partition 2 with a primary key of 1. The child row has a foreign key set to the primary key value of its parent—132. The decision is made to delete both rows. At the source system, this takes place properly by deleting the child row first and then the parent row.

However, since the two rows are in different partitions, the replication engine may read these changes in the opposite order from the Change Log and may deliver them that way to the target system. The result is that the target system will attempt to delete the parent row first. This change will fail since the parent row still has a child row. The target system will then successfully delete the child row. The result is that the parent row still exists on the target system.

1.7.3.4 Derived Value Error

In some databases, certain columns are derived values. For instance, an Invoice Table row may have a column that is the sum of all of the values of the rows in the Line-Item Table. This is a violation of database normalization, which precludes the same value from being in more than one row. However, it is done for performance purposes. It is much faster to read just a row from the Invoice Table to get the sum of the invoice than it is to read all of the Line-Item rows for that invoice so that their values can be summed.

If a change is made to a value in a Line-Item row and the Invoice-Table row is not also updated, the two become out of sync (causing a relational constraint violation) and the change may be rejected.

1.7.3.5 Cascade Deletes

If a row with dependencies is deleted, a cascade delete will automatically delete not only the specified row but all of the dependent rows. For instance, if a parent row with child rows is deleted, not only will the parent row be deleted, but all of the child rows will be deleted.

1.7.3.6 Reordering of Changes Within a Thread

Up to this point, we have assumed that all changes made within a single thread will appear in the Change Log in the correct order. While this may be true, it is possible that changes for a given thread may be presented to the target system out of order during the extract, delivery, or other processing of the changes in the Change Log. Furthermore, if multiple independent communication channels and/or a multithreaded replication engine are used to send changes from the Change Log on the source system to the target system, changes within a DBMS thread may be delivered to the target system out of order if they are distributed between the communication channels or replication engine threads.

The preferred embodiment of the present invention will resolve most cases of changes within a thread being sent to the target system out of order, as described in Section 4.5, "Change Reordering Within a Thread." However, as described in that section, there are some cases that cannot be resolved by the present invention. Therefore, if multiple communication channels and/or a multithreaded replication engine are used, all changes associated with a DBMS processing thread such as the changes to a particular volume typically will be sent to the target system over a single communication channel and/or a single replication thread in order to maintain proper order.

1.8 Reversing Changes

Though not caused by partitioning, another relational constraint data conflict that must be handled similarly to relational constraint violations is that of reversing changes. A reversing change is an undo operation that reverses a prior failed change on the source system, and is incorporated into the present invention's definition of a relational constraint violation.

Consider a table in which the rows have a unique alternate key. Two rows in this table are represented below:

[P1, 1, 6]
[P1, 2, 8]

The rows have primary keys of 1 and 2 and unique alternate keys of 6 and 8, respectively. The application attempts to insert a new row [P1, 3, 8]. This insert may be entered into the Change Log, but it will fail when executed at the source system because of a duplicate unique alternate key. To prevent the failed change from being executed on a replay, a reversing delete may be inserted into the Change Log by the source system following the failed change. If this occurs, the Change Log will contain the following operations as a result:

I(P1, 3, 8)
RD(P1, 3, 8)

Similarly, if the application attempts to change the unique alternate key in the row [P1, 1, 6] to a value of 8, the change will fail due to a duplicate unique alternate key error. The change log will then contain a reversing update:

U(P1, 1, 8)
RU(P1, 1, 6)

If an application attempts to delete a parent row that still has a child row, a reversing insert will be inserted into the change log:

D(P1, 1) A parent row with a child
RI(P1, 1)

These reversing sequences typically will be replicated to the target system in proper order (they affect the same partition, and typically the same record or row in that partition). In the present invention, the target system must be able to handle them correctly. It must recognize the reversing sequences and take appropriate action, such as discarding both the original and the reversing event.

1.9 DBMS Relational Constraint Checking

Some DBMSs do not perform relational constraint checking. Others check for relational constraint violations on each change to the database or at transaction commit time (often referred to as deferred relational constraint checking). In the two latter cases, if a relational constraint violation is found, the transaction is aborted.

If the DBMS performs no relational constraint checking or performs deferred checking at commit time, the preferred embodiment of the present invention ensures that each transaction that is submitted to the target database is relationally correct.

However, if the DBMS checks for relational constraint violations on each change, changes cannot be given to it in any order. They must be properly ordered to avoid relational constraint violations. The preferred embodiment of the present invention ensures that changes are applied to the target database in correct order to avoid relational constraint violations.

1.10 Heterogeneous Target Database

In some systems, the target database is a different structure from the source database. The source database may or may not provide relational constraint checking, and the target database may or not provide relational constraint checking.

It is the responsibility of the data replication engine to convert the data stream of changes from the source database to the format required by the target database. If the relational constraints enforced by the target database are different from those at the source database, the present invention ensures that the target database relational constraints are observed.

1.11 Oracle GoldenGate

Oracle® GoldenGate® (OGG), located at Redwood Shores, Calif., USA, has documented a prior art approach for processing certain relational constraint violations. However, the OGG solution always applies the data change events to the target database in the order they occurred in the source transaction, and then when one or more change fails, they add them to a set-aside list. Then, at the end of the transaction, as a post-apply step, OGG tries to resolve those events that failed. This is not helpful for avoiding the issue of a DBMS that auto aborts the underlying transaction when the apply step fails, a condition the present invention avoids. The OGG approach does not check for constraint violations or other potential issues prior to applying the change into the target database, whereas the present invention can check for such issues prior to applying the event into the target database, and the OGG approach only checks the events on the set-aside list at the end of processing the source transaction, rather than periodically as the source transaction events are received and processed. This greatly increases the chances for additional violations to occur, may cause auto-aborts, and causes the processing at the end of the transaction to be more complex.

More specifically, the OGG approach consists of the attributes for TMFEXCEPTIONS & NOTMFEXCEPTIONS, along with the related REPORTTMFEXCEPTIONS setting. The OGG approach always processes the change data events in the order read from the change queue, only for committed transactions that have already completed, by replaying the events for each transaction in committed transaction order. The present invention can process the events in the order received, rather than waiting for the transaction to end before it starts it replay.

1.12 What is Needed

Replaying a source database change queue of events at a target database may cause relational constraints to be violated. This can occur when the source and target environments have different relational constraints defined, when the source and target environments have differences in structure or format, when they are from different vendors, or due to certain idiosyncrasies in how the file systems work, for example in the case of failed source operations that result in reversing operations being added to the change queue. It may also occur when a DBMS arbitrarily intermixes the order of changes on different partitions at the target system following replication, and this can lead to target database corruption.

Also, for some DBMS environments, a violation of a relational constraint may auto-abort the target transaction that is used to apply the events into the target database.

What is needed are methods to reorder these changes into the correct order so that they can be applied correctly at the target system or at least end up in the correct order such that the target database matches the source database. Methods are needed to avoid the auto-aborts that can occur at the target database for some DBMS's when a relational constraint is violated.

Also, methods must be provided to properly handle reversing events so that they result in no changes to the database.

BRIEF SUMMARY OF THE INVENTION

2 Brief Summary

In certain configurations of a DBMS, the changes made to the database may be recorded in the Change Log in an order that is different from the order in which they were executed. The Change Log is used as the source of changes to be replicated to a target system, where they are applied to a target database to keep it synchronized with the source database.

Furthermore, even if the changes in the Change Log for each thread are in the proper order, the extraction and processing of these changes before they are delivered to the target system may cause an improper ordering of changes.

If a target system receives replicated source-system database changes in a different order from the execution sequence at the source system, many of these changes may fail due to relational constraints on the database. For instance, the insert of a child row without a parent row or the delete of a parent row that still has child rows will fail. These failures will cause corruption of the target database.

In addition, some DBMSs insert failed source changes into the Change Log followed by a reversing operation. These operations must be paired so that the failed and reversing operations are discarded and not attempted at the target system.

In the prior art, changes received out of order at the target system could cause relational constraint violations and cause the target transaction to abort. The preferred embodiment of the present invention provides a method to reorder the changes at the target system so that they can be applied properly. The target system attempts to apply changes as it receives them from the replication channel. If a change fails, it is inserted into a set-aside list for later retry.

According to alternative embodiments, the changes in the set-aside list may be periodically replayed if a condition has occurred that may allow their successful executions. For instance the set-aside changes may be replayed whenever an incoming successful change modifies a row that is blocking a set-aside change. If set-aside changes exist at transaction commit time, the set-aside list is replayed to execute any changes for that transaction. If set-aside changes for the transaction still exist after the replay, the set-aside list is replayed again to execute those changes that previously had been unable to be replayed due to constraint violations. This process continues iteratively until all set-aside changes for the transaction have been successfully executed.

If any changes for the transaction still remain on the set-aside list and cannot be successfully applied, these changes may be blocked by differing rules at the target or by data collisions in an active/active system. They are logged for further processing or review.

Computer applications often rely upon a database of information that they keep updated and that they reference when making service decisions. Today's databases are typically resident on disk devices (though solid-state devices are coming into service). A disk is extremely slow compared to computer memory, manipulating data in milliseconds rather than in nanoseconds. Consequently, a disk-based database system can be the limiting factor in application performance and capacity.

To address this limitation, some large data-processing systems have implemented database management systems (DBMSs) that provide a high level of parallel database access. HPE NonStop servers are one example. Typically, a large database is distributed over many (perhaps hundreds or thousands) of disk volumes. The DBMS often manages each disk volume as a separate processing thread. As the application issues database commands, a DBMS routes the commands to the appropriate disk volumes. Though each disk volume typically can execute only one command at a time, all disk volumes may be executing commands simultaneously, thereby greatly improving the performance of the database system.

A DBMS typically records all of the changes made to its database in a Change Log to assist in database recovery in the event of a system failure. If the DBMS is multithreaded, the changes written to the Change Log for one disk volume are not necessarily coordinated with those of other disk volumes. Therefore, the Change Log does not necessarily contain changes in the order in which they were applied to the database.

The Change Log can also be used as a source of changes to be replicated to a target system so that the target system can keep its database synchronized with the source database. If the Change Log has been created by a multithreaded DBMS, the target system may receive the changes in an arbitrary order. Consequently, some of the changes that were successful at the source may fail at the target due to violations of relational constraints that have been imposed on the target tables. For instance, the target system may try to create a row with a unique alternate index that is the same value as that of another row. It may attempt to delete a parent record that has one or more child records. It may try to insert a child record without a parent.

In addition, the source DBMS may insert a failed change or statement into the Change Log, followed by a reversing operation to undo the effects of the failed change or statement. The target system must be able to pair and potentially discard these changes to avoid applying the failed source changes or statements to the target database.

This invention provides a method for a target system to reorder replicated changes received so that they are applied to the target database in the proper order to avoid relational constraint violations. In its preferred embodiment, as changes are received over the replication channel, the target system attempts to apply them to the target database. If a database change fails, the change is put into a set-aside list for subsequent processing.

As an alternative embodiment, the invention provides a method to predetermine if a change will cause a referential constraint violation and if so, enter the change into a set-aside list for subsequent processing. This embodiment will avoid the problem with certain DBMSs that would otherwise abort a transaction if they detect a relational constraint violation.

At transaction commit time (or earlier in some cases), the set-aside list is replayed. Some of the violated relational constraints may have been removed by previously successful changes. In these cases, the affected changes on the set-aside list will be executed successfully. If at the end of a replay, changes for the transaction still exist on the set-aside list, some may have been released by set-aside changes that executed on the previous replay. The set-aside list is replayed again so that the changes can be applied successfully.

The iterative replay of the set-aside list continues until it no longer contains changes for the transaction. At this point, all of the changes within the transaction have been applied successfully, and the transaction can be committed.

In an alternative embodiment, if all of the changes within a first transaction have not been successfully applied after a replay of the set-aside list with no changes executed, further transactions are processed and the set-aside list is replayed. It is possible that another transaction has made a change that, taken out of order, has caused a relational constraint violation for the first transaction. This violation will be removed when later out-of-order changes are applied by the DBMS, and a subsequent replay of the set-aside list will allow the first transaction to complete successfully.

If any events remain on the set-aside list for a transaction and cannot be applied, the replication engine can be configured to stop or to put the transaction on a reject list for subsequent review. This may happen if there are additional constraints on the transaction, such as a column value that must be equal to the sum of the values in another set of columns. Alternatively, the replication engine can reach across to the source environment to determine what the ultimate state of the data at the target should be, and then apply the changes necessary at the target.

3 Definitions

The following definitions describe the use of certain terms in this specification. They are hierarchically ordered in that each definition builds on previous definitions.

Table—A set of data values that is organized using a model of horizontal rows and vertical columns. The columns are identified by name, and the rows are uniquely identified by the values appearing in a particular column subset (the table's primary key). A table usually characterizes an entity set. Each row in the table describes an instance of the entity set. Each column describes an attribute of the entity set.

File—The equivalent of a table for nonrelational databases. A file is made up of records, and each record describes an entity instance. A record is made up of fields, each of which describes an attribute of the entity set. In this specification, the term "table" is to be interpreted as "table and/or file."

Column—A table component that holds a single attribute, such as SALARY, of the entity set.

Field—A file component that holds a single attribute, such as SALARY, of the entity set. In this specification, the term "column" is to be interpreted as "column and/or field."

Row—A table component that represents an entity instance. It is a sequence of {column name, value} pairs usually implemented as a sequence of values positioned according to their corresponding column names. For instance, (EMPLOYEE NUMBER, 235), (NAME, Joe Smith), (DEPARTMENT, Accounting), (SALARY, $30,000).

Record—The same as a row, but "row" is usually used for relational databases; and "record" is usually used for file systems. In this specification, the term "row" is to be interpreted as "row and/or record."

Database—A collection of related tables or files.

Data Manipulation Language (DML)—The operations (events) that control a database's contents, such as insert, update, delete, and read a row or record.

Data Definition Language (DDL)—The operations (events) that control a database's structure, such as add or delete a column or a table.

Event—A request, indication, or other stimulus sent to an application process for processing. DML and DDL database commands are examples of events.

Change—A modification of the content or structure of a database via a DML or DDL command. A change is an event.

Operation—A change to a database. An operation is an event.

Key—A column value that can be used to access that row or another row.

Index—A key. In this specification, the term "index" is to be interpreted as "index and/or key."

Primary Key—A column value that uniquely identifies a row.

Alternate Key—A column value that identifies one or more rows.

Unique Alternate Key—A value in a column other than the primary key column that uniquely identifies the row.

Foreign Key—A value in a column that identifies one or more rows in the same table or in a different table.

Child—a row containing a foreign key pointing to a row in another table.

Parent—a row referenced by the foreign key of one or more children.

Relational i A constraint imposed by the relation of data values or keys. Examples include:
  Only one row in a table may have a particular value of a primary key.
  Only one row in a table may have a particular value of a unique alternate key.
  The row to which a foreign key points must exist.
  Every child must have a parent.

Relational Constraint Violation—A relational constraint violation that causes a database change to fail.

Relational Constraint Conflict—same as a Relational Constraint Violation.

Lock—A data object that is being changed by a transaction is locked until the transaction commits or aborts. While a data object is locked, no other transaction can modify that data object or read it (except in the case in which "dirty reads" are allowed).

Blocking Event—A database change that imposes a relational constraint on another database change and causes the latter change to fail.

Blocking Lock—A lock of a data item is a blocking event on that data item and imposes a relational constraint on the data item. The preferred embodiment of the present invention can handle this case is many instances.

Mutual Blocking Event—A pair of database changes that can block each other. Unique primary keys, unique alternate keys, and parent/child restraints are mutual blocking events.

Releasing Event—a database change that removes a relational constraint on another database change.

Disk Volume—A disk device that contains a portion of a database.

Database Management System (DBMS)—A system that manages a database by controlling the structure of the database and by executing commands against the database, such as inserting data into files or tables.

Change Log—a record of all (or important) changes made to a database.

Program—An executable set of programming code for providing a specific function.

Executable—A program.

Process—A program running in a computer. One program can be spawned as multiple distinguishable processes.

Application—One or more processes cooperating to perform a useful function or service for end users.

Operating System—A software facility that manages computer hardware resources and provides common services for application processes. Typical services include time functions, reading and writing interprocess messages, and database manipulation.

End Users—People, systems, devices, applications, or any other entity that can influence an application or can use the services that it provides.

Multithreading—the ability of a program or an operating system process to manage its use by more than one user at a time and to even manage multiple requests by the same user without having to have multiple copies of the programming running in the computer.

Transaction—A delimited set of database operations (inserts, updates, deletes, reads) that are either all made or none are made. A transaction is guaranteed to leave the database in a persistent, consistent, and correct state; and its results are typically guaranteed to survive system failures.

ACID Properties—Transactions maintain the ACID properties of atomicity, consistency, isolation, and durability. Atomicity means that either all operations contained within the transaction are executed against the database or that none are. Consistency means that at any time, the view of the database represents an accurate view of the application data. Isolation means that a transaction is unaffected by other transactions that are executing simultaneously. Durability means that the resulting modification to the database by a transaction will survive any subsequent system failures. In some implementations, the ACID properties may be relaxed.

Atomicity—See ACID Properties.

Begin Transaction—A directive that indicates the beginning of a transaction. A begin transaction directive may be explicit, or it may be implicit with the first database operation for a transaction.

Begin Work—Equivalent to Begin Transaction.

Commit Transaction—A directive that indicates that a transaction has successfully completed and should be made durable.

Commit Work—Equivalent to Commit Transaction.

Abort Transaction—A directive that indicates that a transaction has been unsuccessful and should be undone with no effect on the database.

Rollback Work—Equivalent to Abort Transaction.

Transaction Manager—A facility for managing the updating of a database by applying transactions to it. A transaction manager ensures that changes to a database maintain the ACID properties.

Set-Aside List—A list of database changes that have failed at the target database.

The "lists" described throughout this application are all "electronic lists" that are maintained in electronic form. For example, the electronic lists can be maintained on disk or memory, can be a FIFO queue, or can be types of set-aside lists.

BRIEF DESCRIPTION OF DRAWINGS

4 Drawings

FIG. 1 shows a prior-art architecture of a computer application.

FIG. 2 shows a prior-art Transaction Manager and its processing of transactions.

FIG. 3 shows a prior-art data replication engine.

FIG. 4 shows a prior-art table partitioned among multiple disk volumes and managed by a DBMS.

FIG. 5 shows a prior-art implementation of a multi-threaded DBMS.

FIG. 6 shows a prior-art violation of a unique alternate key relational constraint due to misordering of database changes.

FIG. 7 shows a prior-art violation of a foreign key relational constraint due to misordering of database changes.

FIG. 8 shows the set-aside list used to reorder changes at the target system.

FIG. 9 shows the replacement of changes on the set-aside list with new changes containing the same primary key.

FIG. 10 shows an example of a simple reordering problem resolved by the set-aside method.

FIG. 11 shows an example of a reversing update that is resolved by the set-aside method.

FIG. 12 shows an example of a complex cascading of unordered changes resolved by replaying the set-aside list at transaction commit time.

FIG. 13 shows an example of a complex cascading of unordered changes resolved by replaying the set-aside list when a database change is successful.

FIG. 14 shows a flowchart for resolving relational constraint conflicts.

FIG. 15 shows a flowchart for replaying the set-aside list.

DETAILED DESCRIPTION OF THE INVENTION

5 Detailed Description

Certain terminology is used herein for convenience only and is not to be taken as a limitation on the present invention.

The words "a" and "an", as used in the claims and in the corresponding portions of the specification, mean "at least one."

A database management system (DBMS) is used to manage the database for an application. The capacity and performance of the database can be significantly improved by using a multithreaded DBMS that services each disk volume in the system's disk farm via a different processing thread. A DBMS typically writes all database changes to a Change Log. If the DBMS is single-threaded, the changes will typically be written to the Change Log in the order in which they were executed. However, if the DBMS is multithreaded, each thread typically will write its changes independently to the Change Log. Thus, although the changes for a particular disk volume typically will be recorded in order in the Change Log, the changes for different disk volumes will be intermixed in an arbitrary order.

Even though changes within a thread may be stored in the Change Log in the proper order, they may not be delivered to the target system in that order, as described in Section 1.7.3.6, "Reordering of Changes Within a Thread."

A similar arbitrary order of events in the Change Log can occur independent of the disk volumes if the DBMS is single- or multi-threaded and it does not guarantee that the change events are recorded in the Change Log in the order in which they were executed.

The Change Log can be used as the source of changes for a data replication engine to replicate the changes to a target system. There, the changes are applied to a target database to keep the target database in synchronism with the source database. However, the misordering of changes received by the target system can result in changes that violate certain database constraints. For instance, a row with a unique alternate index may be inserted or updated with an alternate index that duplicates that of another row in the table. A child row may be inserted without a parent row. A parent row with children may be deleted. These changes may succeed, thus corrupting the target database.

The aforementioned are examples of relational constraints. However, many other types of constraints may be specified for a database. For instance, certain fields may require specific formats. The sums of values in a specific column on one table may have to equal a total field in another table.

In the preferred embodiment, a purpose of the present invention is to reorder replication changes at the target system in order to prevent relational constraint violations and to avoid corrupting the target database. It is a further purpose to correctly interpret reversing operations so that the failed changes being reversed at the source database are not applied to, or are skipped or discarded at, the target database.

4.1 The Set-Aside List

The preferred embodiment to satisfy the aforementioned goals is one that inserts changes that cannot be applied at the target database into a first-in first-out (FIFO) set-aside list. Periodically, as the changes for a transaction are being received at the target system, the changes in the set-aside list are reapplied to the target system in the order in which they were inserted into the list. Previously applied changes may have removed the constraint causing the failure of a change. If so, the change will be successfully applied. If the change still fails, it is put back into the set-aside list. This process is iteratively repeated until all changes in the set-aside list for a given transaction have been successfully applied to the target database. At this time, the transaction can be committed.

FIG. 8 shows the implementation of the set-aside list at the target system. As changes from the source-system's Change Log are received (1) by the replication engine's Applier (2), the Applier passes them to the target's DBMS (3) for application to the target database (4). If a change cannot be applied (5), it is placed in the set-aside list (6) by the replication engine's Applier.

When the replication engine receives commit tokens from all resources involved in a transaction, it knows that it has received all changes for that transaction. The Applier replays all of the transaction's changes that are in the set-aside list (7) and sends them to the target DBMS for application to the target database. If previous changes have removed the constraint violation for a change in the set-aside list, that change will now complete successfully. If a change still fails, it will be returned to the set-aside list.

If at the end of the replay, changes for the transaction remain on the set-aside list, the list is again replayed because the previous replay may have removed further constraints. This procedure is repeated continuously until all of the transaction's changes have successfully completed. The Applier then can request the target's Transaction Manager to commit the transaction.

If the set-aside list is reprocessed with no changes for that transaction having successfully been processed, it may indicate that some changes in the list cannot be applied. They may be constraints that are not relational. Alternatively, they may be conflicts caused by data collisions in an active/active system. In such instances, the changes are considered I/O failures; and the configured error processing will be executed. For instance, this may involve logging the error, aborting the transaction, writing the transaction to a reject log, writing just the failed I/O to a reject log and continue the processing of the transaction, and/or stopping replication.

4.2 The Set-Aside Algorithm 4.2.1 Definitions

In order to demonstrate why the set-aside algorithm corrects the intended constraint violations, certain terms are first defined:

Event—A change to be made to the database. "Event" is to be interpreted as "change."

Blocking Events—An event $E_A$ blocks event $E_B$ if it introduces a constraint that causes $E_B$ to fail. For instance, an event that inserts a row with a unique alternate key index will block another event that tries to insert a row with the same alternate key index. It will also block another event that attempts to update a row and change its unique alternate key to the one that was previously inserted:

| | | |
|---|---|---|
| Event $E_A$ | I(P1, 1, 1) | |
| Event $E_B$ | I(P1, 2, 1) | event $E_A$ blocks event $E_B$ - duplicate unique alternate key error |
| Event $E_A$ | I(P1, 1, 1) | |
| Event $E_B$ | U(P1, 3, 1) | event $E_A$ blocks event $E_B$ - duplicate unique alternate key error |

The delete of a parent will block the insert of a child:

| | | |
|---|---|---|
| Event $E_A$ | D(PARENT, P1, 10) | |
| Event $E_B$ | I(CHILD, P1, 2, 10) | event $E_A$ blocks event $E_B$ - no parent for child |

Mutually Blocking Events—Two events $E_A$ and $E_B$ are mutually blocking events if $E_A$ can block $E_B$ and if $E_B$ can block $E_A$. Unique primary keys, unique alternate keys, and foreign keys are constraints that lead to mutually blocking events. For instance, the unique alternate key sequences given above are mutually blocking events:

| | |
|---|---|
| Event $E_A$ | I(P1, 1, 1) |
| Event $E_B$ | I(P1, 2, 1)   event $E_A$ blocks event $E_B$ - duplicate unique alternate key error |
| Event $E_B$ | I(P1, 2, 1) |
| Event $E_A$ | I(P1, 1, 1)   event $E_B$ blocks event $E_A$ - duplicate unique alternate key error | and

| | |
|---|---|
| Event $E_A$ | I(P1, 1, 1) |
| Event $E_B$ | U(P1, 3, 1)  event $E_A$ blocks event $E_B$ - duplicate unique alternate key error |
| Event $E_B$ | U(P1, 3, 1) |
| Event $E_A$ | I(P1, 1, 1)  event $E_B$ blocks event $E_A$ - duplicate unique alternate key error |

The foreign-key parent/child sequence given below creates mutually blocking events:

| | |
|---|---|
| Event $E_A$ | D(PARENT, P1, 10) |
| Event $E_B$ | I(CHILD, P1, 2, 10)   event $E_A$ blocks event $E_B$ - can't insert a child without a parent |
| Event $E_B$ | I(CHILD, P1, 2, 10) |
| Event $E_A$ | D(PARENT, P1, 10)   event $E_B$ blocks event $E_A$ - can't delete a parent with a child |

Releasing Event—An event $E_A$ releases an event $E_B$ if $E_A$ removes a constraint that would have caused $E_B$ to fail:

| | |
|---|---|
| Event $E_A$ | D(P1, 1, 1) |
| Event $E_B$ | I(P1, 2, 1)   event $E_A$ removes the constraint on $E_B$ |

4.2.2 The Algorithm

The preferred embodiment is straightforward. Data replication proceeds until it finds a situation where it cannot apply an event, such as when the Applier encounters a relational constraint violation. The Applier puts the change causing the relational constraint violation in the set-aside list and continues on. Periodically, the set-aside list is replayed to execute changes that no longer cause a relational constraint violation.

In some DBMS systems, the DBMS system will automatically abort a transaction when a change is received that causes a constraint violation. This may prevent that transaction from being processed successfully via the present invention's set-aside algorithm. An alternative embodiment corrects this situation. The constraint-checking responsibility is transferred to the data replication engine, for example via user exits that check for the violation before executing the change event. This avoids the DBMS auto-aborting a transaction when a constraint is violated. The replication engine will detect constraint violations and will place blocked changes into the set-aside list for later processing.

In an alternative embodiment, before set-aside processing is enabled, the target system reads the constraints for all of the tables that are going to be affected by replication. The constraints on these tables are recorded for use by the set-aside algorithm.

Processing replicated changes at the target system proceeds as follows:

1. Because the transaction succeeded on the source system, there should be a sequence of changes that will allow all changes to be applied to the target system without constraint failure.
2. All rows that were successfully changed at the target without constraint failure will have the same value as those rows on the source system at the end of the transaction.
3. Whenever a change is received that is for the same row (i.e., the same primary key) as a change in the set-aside list, the new change is attempted. If it is successful, the old change on the set-aside list is discarded. If the new change is not successful, it replaces the old change on the set-aside list. This process is detailed in FIG. 9. Note that the new changes arrive at the target system in the same order as they were applied at the source system because they affect the same table (in fact, the same row) and were therefore processed by the same DBMS thread.
4. As an alternative embodiment to that described in Step 3, if the new change is not successful, it is added to the end of the set-aside-list. The set-aside list is then replayed in case there is an earlier entry in the set-aside list that removes the relational constraint on the new change.
5. Since the changes in the set-aside list are updated with the latest image as subsequent changes for the same row are received, the set-aside list will reflect the state of the source system at the end of the transaction.
6. At commit time, the committed transaction's changes still in the set-aside list are retried in order. Ultimately, the first change listed will be retried first. Since it was successfully applied at the source system, and since it is the earliest change in the list from the source system's perspective, there should have been a releasing event that has already been applied to the target database. Therefore, the blocking condition for this change should have been removed; and the change can be successfully applied to the target database and removed from the set-aside list.
7. By repeating this sequence iteratively, all changes ultimately should be successfully applied.
8. If all changes cannot be successfully applied, the transaction should be flagged for further analysis using the options previously mentioned in Section 4.1, "The Set-Aside List" (e.g., log and continue, log and stop, etc.). This can occur, for instance, if the target environment does not match the configuration of the source environment or if relational conflicts were caused by data collisions in an active/active system.

Note that, at any point, if the source transaction aborts (instead of commits), the target transaction is aborted and the set-aside list for that transaction is drained (the events are discarded), and processing continues with the next change event.

4.2.3 Cross-Transaction Parallelism

In some applications, there may be parallelism between transactions. One transaction may remove a blocking event from a row, and another transaction may then update that row. If the transactions are replayed out of order at the target system, the second transaction will fail followed by the first transaction, which will succeed.

An example of such a case is a transaction that deletes a row with a unique alternate key. A subsequent transaction inserts a row with that unique alternate key in another partition. Since the transactions affect different partitions, their changes may be included in the Change Log in any order. If the second transaction, the insert transaction, is replicated to the target database first, it will fail because of a duplicate unique alternate key error. The first transaction, the delete transaction, will then be replicated to the target database and will succeed. The result is that there is no row with that unique alternate key.

An alternative embodiment of the current invention solves this problem. Rather than rejecting the transaction if all of its changes cannot by applied at commit time, as specified in Step 7 in Section 4.2.2, "The Algorithm," the transaction remains active and its remaining changes that are causing relational constraint violations are kept in the set-aside list. As further transactions commit (or as further changes are made to the database), the changes in the set-aside list for the stalled transaction are replayed. If a later transaction removes the relational constraint violation(s), the stalled transaction will complete and can be committed.

4.2.4 Reversing Events

The above description of the set-aside algorithm primarily describes the resolution of relational constraints. However, Step 3 of the algorithm also resolves reversing events, as described in Section 4.3.2, "Reversing Update Example." A reversing event should arrive at the target system after the failed change that it is reversing since both events apply to the same table, and more specifically typically to the same record or row in that table.

In order to process reversing events more efficiently, an alternative embodiment can modify the set-aside algorithm as follows. It can determine a reversing event by comparing the after image of the new event to the before image of the change on the set-aside list. If the images are identical, the new event is undoing the action of the earlier change. The new event does not have to be executed (it can be discarded), and the earlier change can be removed from the set-aside list and also discarded.

4.2.5 Alternative List Processing Options

In an alternative embodiment, the set-aside list could be processed prior to the commit whenever a change is successfully applied that might have removed a blocking constraint on one of the items in the list. For instance, the set-aside list could be replayed whenever an incoming change is applied to a table that has included within the set-aside list a change that failed because of a duplicate alternate key error.

In another alternative embodiment, the set-aside list could be replayed each time a change completes successfully, since the change may have removed a constraint that is blocking a change on the set-aside list.

4.2.6 Prevalidation

In some cases, database managers perform relational constraint checking as changes are applied to the database. These databases will return an error on a relational constraint violation. This error indication can be used by the set-aside algorithm to reject the change and put it on the set-aside list.

Some database managers that conduct relational constraint checking, such as HPE's NonStop SQL/MX, Version 3.2, will abort the transaction if they see certain types of relational constraint violations. One such example includes a referential relational constraint violation. In such instances, the transaction must be prevalidated by the replication engine Applier, which will check the database to determine if the change will cause a violation. If the Applier determines that a violation will occur if the event is applied, thereby automatically causing the transaction to abort, it will place the change into the set-aside list for later processing, as described in this disclosure.

Some database managers, such as HPE's NonStop SQL/MP, Version 3, do not perform relational constraint checking. In this case, it is up to the Applier to check the status of the database whenever a change that might violate a relational constraint is applied. The Applier will put such changes on the set-aside list for later processing, as described above.

4.2.7 Other Uses for the Set-Aside Method

The set-aside method has been described in terms of using it in a data replication environment by a source-side multi-threaded DBMS. However, there are other uses for the method as well:

Even if the source-side DBMS is single-threaded so that all changes reach the target system in the same order as they were executed at the source system, there is still the problem of resolving reversing transactions. As previously described in Section 4.2.2, "The Algorithm," with respect to FIG. 9, and as further described in Section 4.3.2, "Reversing Update Example," the set-aside method provides this function.

If a multithreaded replication engine or communication channel is used, it may deliver changes over different threads to the target system even if the Change Log is properly ordered. The set-aside algorithm can reorder these changes so that they can be applied without the threat of relational constraint violations.

If a Transaction Manager is implemented for a single-threaded DBMS, it may not be able to use the Change Log created by a multithreaded DBMS to roll forward or roll back transactions. In an alternative embodiment, the set-aside method can reorder the changes in the Change Log so that the Transaction Manager can use a Change Log in which changes are not ordered properly.

4.3 Examples of Set-Aside Processing

Several examples of the use of set-aside processing follow:

4.3.1 Simple Out-of-Order Example

FIG. 10 is an example of using the set-aside algorithm to resolve a relational constraint violation caused by the reordering of changes. The source database contains a row [P1, 1, 10] in Partition 1. The row has a unique alternate key of value 10. The application deletes this row and reinserts it into Partition 2 with a new primary key. The result is the row [P2, 2, 10].

Because these changes affected different partitions, they may be written into the Change Log in the reverse order. If this should happen, the target system will receive the changes over the replication channel in reverse order. The first change that it receives is the insert of the new row into Partition 2. This change will fail due to a duplicate key error, and the change will be placed into the set-aside list.

The next change that it receives will be the delete of the row from Partition 1. This change will succeed.

At this point, the transaction commit is received. The set-aside list will be replayed. It contains the insert of the new row into Partition 2. This change can now be replayed, and it will be successful. The result is that the new row [P2, 2, 10] will be inserted into the target database.

4.3.2 Reversing Update Example

FIG. 11 illustrates the handling of reverse operations. The source table contains two rows—[P1, 1, 1] and [P1, 2, 2]. Each has a unique alternate key—1 and 2, respectively.

The application attempts to update the first row with U(P1, 1, 2). This change is put into the Change Log but fails because of a unique alternate key error. Therefore, a reversing update RU(P1, 1, 1) is entered into the Change Log by the DBMS to undo the failed change.

At the target system, the erroneous update U(P1, 1, 2) is replicated from the Change Log (it should arrive before the reversing update since both operations are in the same table row). The update fails due to a unique alternate key error and is put into the set-aside list. The reversing update RU(P1, 1, 1) is then received from the replication channel. Since it has the same primary key as a change on the set-aside list, it replaces that change. Consequently, the failed U(P1, 1, 2) update change is replaced with the U(P1, 1, 1) update change.

At this point, the transaction commit is received at the target system; and the set aside list is processed. The update change U(P1, 1, 1) succeeds and causes no change. The result is that the target rows remain unaffected.

In an alternative embodiment, both the failed source change and the reversing event simply can be discarded.

4.3.3 Cascading Changes Example

A more complex example is shown in FIG. 12. In this example, the set-aside list is replayed at transaction commit time.

Initially in the database is a row in Partition 2 with a primary key of 2 and a unique alternate key of 1 [P2, 2, 1]. Another row in Partition 3 has a primary key of 3 and a unique alternate key of 2 [P3, 3, 2]:

[P2, 2, 1]
[P3, 3, 2]

The intent is to move the first row from Partition 2 to Partition 1 [P1, 1, 1] and the second row from Partition 3 to Partition 2 [P2, 2, 2], changing their primary keys to 1 and 2 respectively:

[P2, 2, 1]→[P1, 1, 1]
[P3, 3, 2]→[P2, 2, 2]

The application first attempts to do this by inserting row [P1, 1, 1] into Partition 1 via the operation I(P1, 1, 1), then by updating row [P2, 2, 1] to [P2, 2, 2] via the operation U(P2, 2, 2), and finally by deleting row [P3, 3, 2] via the operation D(P3, 3, 2):

I(P1, 1, 1)
U(P2, 2, 2)
D(P3, 3, 2)

The insert and update changes are put into the Change Log but fail because of a duplicate unique alternate key error. The reversing operations RD(P1, 1, 1) and RU(P2, 2, 1) are inserted into the Change Log to undo these changes. However, the delete operation succeeds and is entered into the Change Log.

The application can now update row [P2, 2, 1] to [P2, 2, 2] via the operation U(P2, 2, 2) and insert the row [P1, 1, 1] via the operation I(P1, 1, 1):

U(P2, 2, 2)
I(P1, 1, 1)

The rows have now been moved as desired.

Of course, the order of changes on different partitions may be entered into the Change Log in arbitrary order. FIG. 12 shows the order of changes as they appear in the Change Log and as they are replicated to the target system.

The target system receives the first three changes in the same order as they were applied at the source system. As happened at the source system, the first insert and update operations fail. They are therefore put into the set-aside list. However, the delete operation succeeds; and the row is removed from Partition 3.

The next change received by the target system is the reversing delete for the failed insert operation. Therefore, the insert operation is removed from the set-aside list. The next operation is once again the failed insert change. It continues to fail because of a duplicate alternate key error and is placed back into the set-aside list.

The next operation received by the target system is the reversing update for the failed update operation. The update change is removed from the set-aside list, leaving only the failed insert change. Finally the update U(P2, 2, 2) is executed successfully to move the row from Partition 3 to Partition 2.

At this time, the transaction commits at the source system; and the set-aside list is replayed. The only change in the set-aside list is the insert of the row into Partition 1. The insert succeeds, and the target database now corresponds to the source database.

FIG. 13 shows the same example, but instead of replaying the set-aside list at transaction commit time, the set-aside list is replayed after every database change that is successfully applied to the target database. The changes at the source system are the same as described above, as are the order of changes in the Change Log.

Processing at the target system begins with the same sequence as the previous example. The initial insert and update fail due to a duplicate key error and are placed in the set-aside list. However, the next change, a delete, succeeds. This triggers the replay of the set-aside list. The insert stills fails and is left on the set-aside list. However, the update succeeds because its blocking restraint has been removed by the successful delete operation. The update is removed from the set-aside list.

The successful update triggers another replay of the set-aside list. This time, the insert is successful because the update has removed its blocking restraint. The insert is removed from the set-aside list, which is now empty.

The next pair of changes from the Change Log deletes the row [P1, 1, 1] and reinserts it. Both changes succeed. However, the next operation is a reversing update. It fails due to a duplicate key error and is put on the set-aside list. The last change is on the same row as the failed reversing update. It replaces the failed reversing update on the set-aside list and is retried. It is successful and is removed from the set-aside list. Since the set-aside list is empty at transaction commit time, it is not replayed. The target database is in the same state as the source database.

4.3.4 Blocking Lock Example

If a data item is locked by a transaction, that lock typically acts as a blocking event on the data item. If another operation is received that attempts to change the value of the data item that is blocked by the lock, the new operation is blocked.

With the preferred embodiment of the present invention, the new operation can be put on the set-aside list. When the blocking lock is removed (e.g., the data item has been unlocked), the set-aside operations are replayed and the operation that had been blocked by the lock can now proceed.

4.4 Aborts

So far in the description of the present invention, it has been assumed that the transaction commits and that either all of its changes have been successfully applied or that it has been placed on a Reject List for subsequent review. However, it is also possible that the application or the DBMS will abort the transaction.

In the preferred embodiment, if a transaction is aborted, any items for that transaction on the set-aside list are deleted (discarded). The DBMS will undo any changes that have been made by the transaction to the database, typically by aborting the target transaction.

A special case occurs if a portion of the transaction has been precommitted. The application can precommit a portion of the transaction if its processing is deadlocked with another application (this can happen particularly between the target side of a replication engine and an application, for example in an active/active application environment). A deadlock occurs if two applications each hold a lock on a data item that the other application wants to lock.

In this case, one of the applications can precommit the part of the transaction that it has completed. This will release its locks and allow the other application to proceed. The precommitting application can then complete its transaction. This is often a strategy used be a data replication engine when it deadlocks with an application.

If the abort of a transaction that has been precommitted occurs, the preferred embodiment again is to delete any items for that transaction that are on the set-aside list and to let the transaction manager roll back the changes that have been made to the database under the precommitted transaction. If that is not possible, the data replication engine can replay the undo events for the aborted transaction at the target, and ultimately commit those changes to undo their effect against the target database.

4.5 Change Reordering within a Thread

Typically, all changes made by a DBMS processing thread will be placed in the Change Log in proper order and will be replicated to the target system in proper order. However, if such changes are sent to the target system over multiple communication channels and/or multiple replication threads, they may arrive at the target system out of order. As stated in Section 1.7.3.6, "Reordering of Changes Within a Thread," the present invention will resolve most cases of changes within a thread being sent to the target system out of order.

Some examples follow.

4.5.1 Delete/Insert Changed to Insert/Delete

If a delete of a row followed by the insert of a new row (D/I) is reversed to an insert followed by a delete (I/D), the insert will fail due to a duplicate primary key error and will be put in the set-aside list. The delete operation will succeed; and the insert, when replayed from the set-aside list, will succeed. The present invention handles this case successfully.

4.5.2 Update/Delete/Insert Changed to Insert/Update/Delete

In this example, an update/delete/insert (U/D/I) sequence of changes in a row is changed so that the insert comes first (I/U/D). The insert will fail due to a duplicate primary key error and will be put in the set-aside list. The update will succeed, as will the delete. At this point, the insert replayed from the set-aside list will succeed, leaving the row in its correct state. The present invention handles this case successfully.

4.5.3 Update/Delete/Insert Changed to Delete/Update/Insert

In this example, an update/delete/insert (U/D/I) sequence of changes on a row is changed so that the delete comes first (D/U/I). The delete will succeed, but the update will fail and will be put in the set-aside list. The insert will succeed; and the update, when replayed, will succeed. In this case, the row is left with the data specified by the update rather than the insert and is incorrect. The present invention does not handle this case successfully.

4.5.4 Delete/Insert/Update Changed to Update/Insert/Delete

In this example, a delete/insert/update (D/I/U) sequence of operations is reversed to an update/insert/delete (U/I/D) sequence of operations. The update will succeed, but the insert will fail due to a duplicate primary key error and will be put in the set-aside list. The delete will succeed, and the insert will succeed when replayed from the set-aside list. In this case, the row is left with the data specified by the insert rather than that specified by the update. This is incorrect. The present invention does not handle this case successfully.

4.5.5 Avoid Multithreading DBMS Threads

The above examples reflect the errors that may arise if the changes for a DBMS processing thread are sent to the target system over multiple communication and/or replication threads. It is therefore typical in a multithreaded replication environment to ensure that all changes for a particular DBMS thread are replicated to the target system over a common replication thread.

4.6 Ready-to-RI-Check Transaction Management Facility Call

As an alternative embodiment, misordering in the Change Log can be prevented by adding an application capability to the transaction management facility that allows the application to command a flush of the cache buffers to the Change Log. For purposes of this description, this application call will be called RTRI (Ready To RI Check). When the application issues this instruction, the contents of the Change Log caches shown in FIG. 5 will be flushed to the Change Log disk.

As an example of the use of the RTRI call, consider an application that is inserting a parent record to one disk volume and a child record for the parent to another disk volume. If no specific action is taken, these inserts may be recorded in the Change Log in the reverse order (child followed by parent).

However, if the RTRI facility were available, the application could insert the parent record and then call RTRI. The insert of the parent record would be written to the Change Log disk. The application could then insert the child record and call RTRI. The child record would be written to disk following the parent record, thus maintaining the proper order in the Change Log.

This same capability could be automatically embedded into the DBMS and invoked automatically when constraints are defined. In this case, the DBMS can automatically flush the events as they occur when they are involved in a relational constraint definition. For example, when a parent/child relationship occurs and the parent row followed by a child row is inserted by the application, the DBMS could automatically and immediately flush the parent event into the change log when it is inserted into the database to make sure it precedes the child event in the change log.

5 Flowchart for the Method for Resolving Relational Constraint Conflicts

Flowcharts that summarize the system and method for resolving relational constraint conflicts, as described in this specification, are shown in FIG. 14 and FIG. 15. These flow charts show the preferred embodiment and some alternate embodiments.

5.1 Main Flow for Resolving Relational Constraint Conflicts

FIG. 14 shows the main flow for the method. The next change to be processed is accessed from the source-side Change Log by the replication engine and replicated to the target database. If the change is for a row that already has an entry in the set-aside list, that entry is deleted as the new entry will replace it. If the new entry is a reversing entry, it is discarded.

If the DBMS does not check for relational constraint violations, the change is checked to see if it will cause a relational constraint violation. If so, it is put into the set-aside list. If it will not cause a violation, it is applied to the database. If the change is not applied successfully to the database, the change is put into the set-aside list. If it is applied successfully, the next change in the Change Log is processed.

As alternative embodiments, the invention handles the case of a DBMS that does relational constraint checking either on each change or at commit time. If the DBMS checks relational constraints on each change and auto-aborts if it finds a violation, the change cannot be applied directly via the DBMS. Rather, the data replication engine must check whether or not the change will cause a relational constraint violation. If it determines that the change will cause a violation, the change is put into the set-aside list. Otherwise, the change is passed to the DBMS to be applied to the database. If the change is not applied successfully, the change is put into the set-aside list. If it is applied successfully, the next change in the Change Log is processed.

If the DBMS checks for relational constraint violations only at commit time but will not abort if it finds one prior to the commit (that is, it simply rejects the change), the change is applied to the database. If the change causes a relational constraint violation, the DBMS will reject the change, and the change is put into the set-aside list. If it is applied successfully, the next change in the Change Log is processed.

As alternative embodiments, the present invention can be configured to either replay the set-aside list on each change, or only on a transaction commit, or when or if a subsequent event matches the key values of an existing row in the set-aside list. If it is configured to replay the set-aside list on each change, then the Replay Set-Aside List logic is invoked; and the next change in the Change Log is then processed. If the configuration is to replay the set-aside list only on a transaction commit, and if this change represents the end of a transaction, then the Replay Set-Aside List logic is invoked. If the change were for an event that was already on the set-aside list, and if the set-aside list is to be replayed if this occurs, the Replay Set-Aside List logic is invoked. Otherwise, the next change in the source system's Change Log is processed.

5.2 Replay Set-Aside List Logical Flow

A flow chart for replaying the set-aside list is shown in FIG. 15. The first entry in the set-aside list is accessed.

If the DBMS does not check for relational constraint violations, the change is checked to see if it will cause a relational constraint violation. If so, it is returned to the set-aside list. If it will not cause a violation, it is applied to the database. If the change is not applied successfully to the database, the change is returned to the set-aside list. If it is applied successfully, the next entry in the set-aside list is processed.

As alternate embodiments, the invention handles the cases of a DBMS that does relational constraint checking either on each change or at transaction commit time. If the DBMS checks relational constraints on each change and auto-aborts if it finds a violation, the change cannot be applied directly via the DBMS. Rather, the Replay Set-Aside List logic must check whether or not the change will cause a relational constraint violation. If it determines that the change will cause a violation, the change is returned to the set-aside list. Otherwise, the change is applied to the database. If the change is not applied successfully, the change is returned to the set-aside list. If it is applied successfully, the next entry in the set-aside list is processed.

If the DBMS checks for relational constraint violations only at commit time but will not abort if it finds one (that is, it simply rejects the change), the change is applied to the database. If the change causes a relational constraint violation, the DBMS will reject the change, and the change is returned to the set-aside list. If it is applied successfully, the next entry in the set-aside list is processed.

If there are further entries in the set-aside list, they are processed as described above.

When the end of the set-aside list is reached, a test is performed to see if the set-aside list is empty or if any entries were processed. If one or more entries were processed and more entries remain in the set-aside list, the entire set-aside list is reprocessed as described above. If the set-aside list is empty or if no entries on the set-aside list were processed, a check is made to see if there are any committed transactions that have not been completed. If not, the Replay Set-Aside List logic has been completed, and return is made to the main flow of FIG. 14.

If one or more committed transactions have not yet been applied to the database, then in an alternative embodiment a check is made to see if cross-transaction parallelism is supported. If so, it is possible that other transactions will remove the blocking constraint on the blocked transactions; and return is made to the main flow of FIG. 14 to continue to process further transactions. If cross-transaction parallelism is not supported, the incomplete transactions are put on the Reject list for subsequent review.

6 Summary

Changes made to a database are entered into a Change Log. This log is primarily intended to provide transaction durability. In the event of a system failure, lost transactions can be rolled forward and applied by reading the after images of transaction operations from the Change Log. Likewise, partial transactions can be rolled back by reading the before images from the Change Log.

However, the Change Log is also used to replicate data from a source system to a target system. If the source DBMS is multithreaded, the changes in the Change Log can be recorded in a different order than the sequence in which they were executed at the source system. This means that the target system must be able to properly reorder the changes before applying them to the target database.

In the preferred embodiment, proper reordering is accomplished at the target system by applying changes to the target database as they are received from the replication channel. If a change fails, it is placed in a set-aside list for later retry. The changes are periodically replayed from the set-aside list, perhaps at transaction commit time or whenever a change is successfully executed. If a set-aside change is successful, it is removed from the set-aside list. If a set-aside change fails, it remains on the list. By iteratively processing the set-aside list, eventually all relational blocking constraints should be removed; and all of the changes on the set-aside list should be successfully executed. The target database will be synchronized with the source database. If all transaction changes cannot be executed at commit time, the transaction (or just the failed I/Os) is rejected and flagged for further analysis.

In some applications, cross-transaction parallelism will cause one transaction to block another if the transactions are executed out of order. In an alternative embodiment, this situation is handled by not rejecting the transaction if it cannot complete at commit time. Rather, the transaction remains active and its operations in the set-aside list are replayed as other transactions execute or are committed. Eventually, the transaction that was the blocking transaction will commit, thus releasing the blocked transaction.

Some DBMSs do their own relational constraint checking and will abort the transaction if they detect a relational constraint violation. To deal properly with these DBMSs, in an alternative embodiment, the replication engine is tasked with the responsibility to check each change before it is sent to the DBMS to ensure that the change does not cause a relational constraint violation. If the change does cause such a violation, it is placed on the set-aside list by the replication engine for later replay and is not sent to the DBMS, thus avoiding the DBMS's auto-abort action.

This method can be applied to other situations as well. Even if the source DBMS manager is not multithreaded and if changes are always entered into the Change Log in order, the set-aside method can be used at the target system to resolve reversing changes that undo the effect of the original changes that failed at the source system. Furthermore, in an alternative embodiment, the set-aside algorithm can be used to roll forward or roll back transactions following a source system failure if the Transaction Manager has not been implemented to handle misordered changes in its Change Log.

In one preferred embodiment of the present invention, an extractor and an applier of a database replication system are configured to perform the functions of resolving constraint violations for replicated database transactions. In one embodiment, an extractor replicates changes made at the source database to the target database. An applier immediately applies the changes to the target database that do not cause a constraint violation. The applier also performs the remaining functions, including detecting database changes that cause constraint violations, subsequent processing of these detected database changes, and performing a commit for the database transaction when the constraint violations are resolved. The applier may be the applier shown in FIG. 8. The overall configuration of the database replication system may have the architecture shown in prior art FIG. 3 wherein the extractor acts on the target system and the applier acts on the source system, but with the extractor and applier performing the new functionality described above.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method for resolving constraint violations in a database replication system, the database replication system including a source database and a target database, each database having one or more tables, at least one of the target database tables having one or more constraints, the database replication system replicating source database transactions, the method comprising for each target database transaction:
   (a) replicating changes made at the source database to the target database by immediately applying the changes to the target database that do not cause a constraint violation;
   (b) detecting a database change that causes a constraint violation as a result of one or more of the target database tables having one or more constraints;
   (c) deferring the applying of the database change to the target database of the database change detected in step (b) and posting the database change detected in step (b) to an electronic list;
   (d) repeating steps (a)-(c) until a commit operation is detected in the replicated source database transaction;
   (e) iterating through the database changes on the electronic list by:
      (i) replicating the database changes on the electronic list that no longer cause a constraint violation by applying the changes to the target database and removing the applied database changes from the electronic list, and
      (ii) deferring again the applying of the database changes on the electronic list that still cause a constraint violation and maintaining the deferred database changes on the electronic list; and
   (f) performing a commit for the target database transaction when no database changes remain on the electronic list.

2. The method of claim 1 further comprising:
   (g) performing an abort for the target database transaction if there are any database changes that remain on the electronic list.

3. The method of claim 1 further comprising:
   (g) detecting a database change that reverses a deferred database change on the electronic list; and
   (h) ignoring the detected database change and removing the deferred database change from the electronic list.

4. The method of claim 1 further comprising, before step (f):
   (g) repeating step (e) until no database changes remain on the electronic list or all database changes on the electronic list still cause a constraint violation.

5. The method of claim 1 wherein the electronic list is a first-in first-out (FIFO).

6. The method of claim 1 wherein the electronic list is maintained in memory.

7. The method of claim 1 wherein the constraint violations are caused by referential integrity rules.

8. The method of claim 1 wherein the constraint violations are detected by attempting to apply the database changes.

9. The method of claim 1 wherein the changes made at the source database which are replicated to the target database in step (a) are in the form of a stream of changes.

10. An apparatus for resolving constraint violations when replicating source database transactions from a source database to a target database, each database having one or more tables, at least one of the target database tables having one or more constraints, the apparatus comprising:
    a database replication system configured to perform the following steps for each target database transaction:
    (a) replicate changes made at the source database to the target database by immediately applying the changes to the target database that do not cause a constraint violation;
    (b) detect a database change that causes a constraint violation as a result of one or more of the target database tables having one or more constraints;
    (c) defer the applying of the database change to the target database of the detected database change and post the detected database change to an electronic list;
    (d) repeat the replicating, detecting, deferring and posting until a commit operation is detected in the replicated source database transaction;
    (e) iterate through the database changes on the electronic list by:
       (i) replicating the database changes on the electronic list that no longer cause a constraint violation by applying the changes to the target database and removing the applied database changes from the electronic list, and
       (ii) deferring again the applying of the database changes on the electronic list that still cause a constraint violation and maintaining the deferred database changes on the electronic list; and
    (f) perform a commit for the target database transaction when no database changes remain on the electronic list.

11. The apparatus of claim 10 wherein the database replication system is further configured to:
    (g) perform an abort for the target database transaction if there are any database changes that remain on the electronic list.

12. The apparatus of claim 10 wherein the database replication system is further configured to:

(g) detect a database change that reverses a deferred database change on the electronic list; and (h) ignore the detected database change and remove the deferred database change from the electronic list.

13. The apparatus of claim 10 wherein the database replication system is further configured to, before performing the commit for the target database transaction:

(g) repeat the iteration until no database changes remain on the electronic list or all database changes on the electronic list still cause a constraint violation.

14. The apparatus of claim 10 wherein the electronic list is a first-in first-out (FIFO).

15. The apparatus of claim 10 wherein the electronic list is maintained in memory.

16. The apparatus of claim 10 wherein the constraint violations are caused by referential integrity rules.

17. The apparatus of claim 10 wherein the constraint violations are detected by attempting to apply the database changes.

18. The apparatus of claim 10 wherein the changes made at the source database which are replicated to the target database are in the form of a stream of changes.

* * * * *